United States Patent

Uchihira

[19]

[11] Patent Number: 6,067,415
[45] Date of Patent: May 23, 2000

[54] SYSTEM FOR ASSISTING A PROGRAMMER FIND ERRORS IN CONCURRENT PROGRAMS

[75] Inventor: Naoshi Uchihira, Kawasaki, Japan

[73] Assignee: Kabushiki Kaisha Toshiba, Kawasaki, Japan

[21] Appl. No.: 08/772,652

[22] Filed: Dec. 23, 1996

[30] Foreign Application Priority Data

Dec. 26, 1995 [JP] Japan .................................. 7-338783

[51] Int. Cl.[7] .............................. G06F 15/00; G06F 9/45
[52] U.S. Cl. ......................... 395/704; 395/701; 395/702; 395/706
[58] Field of Search .................................. 395/701, 704, 395/183.01, 183.13, 183.14, 702, 182.04, 706; 707/1, 10, 103

[56] References Cited

U.S. PATENT DOCUMENTS

| | | | |
|---|---|---|---|
| 3,905,023 | 9/1975 | Perpiglia ...................................... | 714/6 |
| 5,048,018 | 9/1991 | Bernstein et al. ....................... | 395/704 |
| 5,682,535 | 10/1997 | Knudsen .................................. | 395/701 |

FOREIGN PATENT DOCUMENTS 8-16429   1/1996   Japan .............................. G06F 11/28

OTHER PUBLICATIONS

M. Girkar, et al., "Extracting Task–Level Parallelism", ACM Transactions on Programming Languages and Systems, vol. 17, No. 4, pp. 600–634, Jul. 1995.

P. V. Koppol et al., "An Incremental Approach to Structural Testing of Concurrent Software", ACM International Symposium of Software Testing and Analysis (ISSTA), pp. 14–23, 1996.

Primary Examiner—James P. Trammell
Assistant Examiner—Cuong H. Nguyen
Attorney, Agent, or Firm—Finnegan, Henderson, Farabow, Garrett & Dunner, L.L.P.

[57] ABSTRACT

A designer creates a program with the editor 1. The division means 2 divides each process of the program into a plurality of controllable sections. The detection means 3 finds the dependency relations among the sessions of the program. The generation means 4 represents as a scenario all the possible execution sequences of the sections in each process. When the designer selects the edge of a section to be executed first at each branch in the scenario with the use of the selection means 6, a scenario containing only the combinations of intended execution sequences is generated. Based on this scenario, the conversion means 9 inserts execution timing control instructions into the first program to convert the first program to a second program. The resulting second program does not contain a harmful nondeterminism. Therefore, a hyper sequential programming system or method for developing reliable concurrent programs is provided easily.

16 Claims, 33 Drawing Sheets

Fig. 19

```
P1()
{
   while(true){
      a1 ;
      if( c ){
         w0 ;
         a2 ;
      }
      else{
         w1 ;
         a3 ;
      }
   }
}

P2()
{
   while(true){
      b1 ;
      r ;
      b2 ;
   }
}
```

Fig. 25

```
P1()
{
    while(true){
        a1 ;
        if( c ){
            w0 ;
            sync(s4) ;
            a2 ;
        }
        else{
            w1 ;
            a3 ;
        }
    }
}

P2()
{
    while(true){
        b1 ;
        sync(s4) ;
        r ;
        b2 ;
    }
}
```

SYSTEM FOR ASSISTING A PROGRAMMER FIND ERRORS IN CONCURRENT PROGRAMS

BACKGROUND OF THE INVENTION

1. Field of the Invention

This invention relates to an improvement in a programming support system and programming support method. More specifically, this invention relates to a programming support system and programming support method that make it easy to develop highly-reliable concurrent programs.

2. Description of the Prior Art

A recent advance in the semi-conductor integrated circuit technology makes possible a complicated processor and a large memory compact and low-cost. This technology makes it possible to build a concurrent system or distributed system composed of many processors. This type of hardware requires special programs such as concurrent programs or distributed programs (hereafter called concurrent program (CP)).

When concurrent programs run, a plurality of processes run simultaneously and concurrently. Typically, a plurality of programs run concurrently on a parallel computer having a plurality of CPUs. A program which runs on a single CPU sequentially but has a plurality of processes running concurrently in a multi-task system is also called a concurrent program. A system featuring physical or logical concurrency is called a concurrent system, where, in general, concurrent programs run. Today, it becomes important not only to develop an efficient concurrency algorithm but also to develop a method for developing concurrent programs efficiently.

Program development efficiency depends largely on finding and correcting bugs in a program, one of program development processes called a test/debug process. Especially, in developing concurrent programs, there are problems specific to concurrent program development which are not found in developing sequential programs. One of these problems is that the processes of a concurrent program do not synchronize with each other and, as a result, the whole concurrent program does not behave correctly. This problem, generated because of concurrent program characteristics, is usually called "nondeterminism".

There are three types of nondeterminism: intended, harmful, and harmless. A intended nondeterminism is the one intentionally introduced by the (program) designer. This nondeterminism, which allows the program to react properly to nondeterminate external stimuli, makes the processes flexible, re-usable, and expandable.

On the other hand, a harmful nondeterminism, which is unintentionally introduced by the designer, sometimes causes program function errors. Human process of thinking, which is sequential, sometimes does not cover all the situations which will be produced by a plurality of processes in concurrent programs. For this reason, some situations not expected by the designer may be generated during execution of concurrent programs.

A harmless nondeterminism affects execution efficiency but does not affect the final result.

The following describes a harmful nondeterminism. Consider the concurrent program shown in FIG. 33. In FIG. 33(a), process P1 (init) initializes the shared memory M, process P2 (read) reads data from the shared memory M, and process P3 (write) writes data into the shared memory M. When these processes run in a concurrent processing system, each on a separate processor, there are six combinations as shown in FIG. 33(b). Because the system operation usually begins with initialization and the correct result is obtained only when the program runs in the sequence of process P1 (init)→P2 (read)→P3 (write) or P1 (init)→P3 (write)→P2 (read), the remaining four combinations (for example, P2→P3→P1), which do not begin with initialization, do not produce the correct result.

The above description indicates that nondeterminism associated with process behavior causes a concurrent program to produce a result depending upon the system status and so on during execution of the program. This means that, as long as nondeterminate problems remain unsolved, concurrent programs, though successfully tested, do no always run correctly.

In most cases, it is more difficult to find bugs associated with nondeterminism than to find bugs in a sequential program. The reason is as follows. The programmer can pass control to all the paths when debugging and testing sequential programs, while the programmer must pass control to all the combinations of paths when debugging and testing concurrent programs (that is, not only all the paths in each process but also all the combinations of process behaviors must be considered). Although it is relatively easy to examine all the combinations of process behaviors in such a simple case described above, a huge number of combinations must be examined in practical program development. In practice, it is impossible to trace all the combinations.

Problems to Be Solved by the Invention

In programming, programming support systems and programming support methods executed on these programming support systems are used traditionally. Programming support systems and programming support methods, usually called development tools, include editors, debugger, preprocessors, optimizers, analysis tools, simulators, compilers, and linkers.

A typical programming procedure used in a traditional programming support system and programming support method executes a program considering all the possible input/output as test cases. When a bug is found, the programmer corrects the source code referring the test result. Also available in a traditional system is an analysis tool which analyzes the structure of source code or data. The compiler uses this analysis result to generate execution code ensuring increased execution and memory efficiency.

The problem with a concurrent program is that, because the behavior depends on the timing in which a plurality of processes of the program run, a huge number of test cases are usually generated (combinatorial explosion). In addition, test cases are difficult to create because timing buggs are difficult to re-produce.

A traditional programming support system or programming support method does not take into consideration the characteristics of concurrent programs when it reflects analysis or test results on a program being developed. This makes it difficult for a conventional programming support system or programming support method to develop reliable concurrent programs.

Hyper sequential programming is an improved version of concurrent program development (Reference: Japanese non-examined patent publication No. 8-16429). In hyper sequential programming, a concurrent program is once converted to a sequential program to produce a hyper sequential program, and the generated hyper program is tested and debugged. That is, the programming has the same difficulty level of testing and debugging as that of a conventional sequential programming, and its difficulty is much less than that of a general concurrent programming. After the program is tested and debugged, the hyper sequential program is converted back to a concurrent program using test/debug information to restore the concurrent program.

The advantage of hyper sequential programming is that the programmer can control harmful nondeterminism elements so that they are executed sequentially in order to suppress the harmful nondeterminism while retaining harmless or intended nondeterminism elements. This allows the programmer to take advantage of flexibility of concurrent programming.

However, it requires the programmer to make a concurrent program sequential to generate a hyper sequential program and, then. to restore the concurrent program. This makes it difficult to create a reliable concurrent program. In addition, it is not easy to omit designer's processing for a harmless nondeterminism in order to increase programming efficiency, nor is it easy to increase programming reliability and efficiency by including a harmless nondeterminism.

This invention seeks to solve the problems associated with the prior art described above. It is an object of this invention to provide a programming support system and programming support method which allow the user to develop a reliable concurrent program based on an execution path (a scenario) showing all the possible execution sequences of each section of a process. It is another object of this invention to provide a programming support system and programming support method which allow the designer to omit his own processing or to include a harmless nondeterminism in order to increase programming efficiency. It is still another object of this invention to provide a programming support system and programming support method which allow the programmer to restore concurrency based on a scenario in order to generate the concurrent program efficiently.

This invention improves the algorithm for making concurrent programs sequential and that for restoring concurrent programs in the hyper sequential programming described above.

SUMMARY OF THE INVENTION

To achieve the above objects, a programming support system of this invention is a programming support system comprising: selection means for selecting a section at a branch in an execution path (a scenario) representing, with the use of said branches, all the possible execution sequences of said plurality of sections of a process of a first program, said process of said first program consisting of a plurality of sections; and conversion means for converting said first program to a second program executing a sequence of said sections, determined by said selection, according to said execution path consisting of branches of sections selected by said selection means.

According to the invention, a process is divided into a plurality of controllable sections, and all the possible execution sequences of the sections are represented by an execution path. An execution path is represented, for example, as a network-structured state transition diagram. In the state transition diagram, a node representing a state is connected, via a branch edge representing an executable section, to the next node representing the next state. In this type of execution path, there are as many paths as execution sequences, each corresponding to one of possible execution sequences of a section. The designer is able to select, at each branch, an edge to be executed first to create an execution path containing a combination of intended execution sequences. The second program generated by converting the first program created according to the execution path should not include a harmful nondeterminism. Thus, according to the invention, simply specifying an execution sequence in the execution path generates a program which will be executed according to the specified sequence, allowing the designer to create a reliable program easily.

A programming support system of this invention is a programming support system comprising: selection means for selecting a section at a branch in an execution path representing, with the use of said branches, all the possible execution sequences of said plurality of sections of a process of a first program, each of said plurality of processes of said first program consisting of a plurality of sections; and conversion means for converting said first program to a second program executing a sequence of said sections, determined by said selection, according to said execution path consisting of branches of sections selected by said selection means.

A programming support method if this invention is a programming support method comprising: a selection step for selecting a section at a branch in an execution path representing, with the use of said branches, all the possible execution sequences of said plurality of sections of a process of a first program, each of said plurality of processes of said first program consisting of a plurality of sections; and a conversion step for converting said first program to a second program executing a sequence of said sections, determined by said selection, according to said execution path consisting of branches of sections selected by said selection step.

According to the inventions, all the possible execution sequences of the sections of each process are represented by an execution path. As with the invention described above, the execution path may be represented, for example, as a network-structured state transition diagram. This execution path contains as many paths as execution sequences, each corresponding to an execution sequence of a section of each process. By selecting an edge of the section to be executed first at each branch, the designer is able to create an execution path containing a combination of intended execution sequences. The second program generated according to this execution path should not include harmful nondeterminism. Thus, the inventions allow the designer to create a program which performs a desired behavior simply by specifying the execution sequences in an execution path, enabling him to create a concurrent program in which a plurality of processes are executed concurrently.

Other and further objects, features and advantages of the invention will appear more fully from the following description.

BRIEF DESCRIPTION OF THE DRAWINGS

FIG. 19 is an example of the source code of the first program used in this embodiment.

FIG. 25 is an example of source code of the second program used in this embodiment.

DETAILED DESCRIPTION

Referring to the attached drawings, there is shown a preferred embodiment of the present invention. Note that each function of this embodiment is implemented by the software controlling the computer and peripheral devices. These specifications explain the invention and embodiment using virtual circuit blocks (". . . means" or ". . . module") corresponding to the functions and processing. Therefore, there is no one-to-one correspondence between blocks and hardware or software components.

In this embodiment, the target machine on which a concurrent program is executed is used also as the host machine on which the concurrent program is developed.

Figure 1:
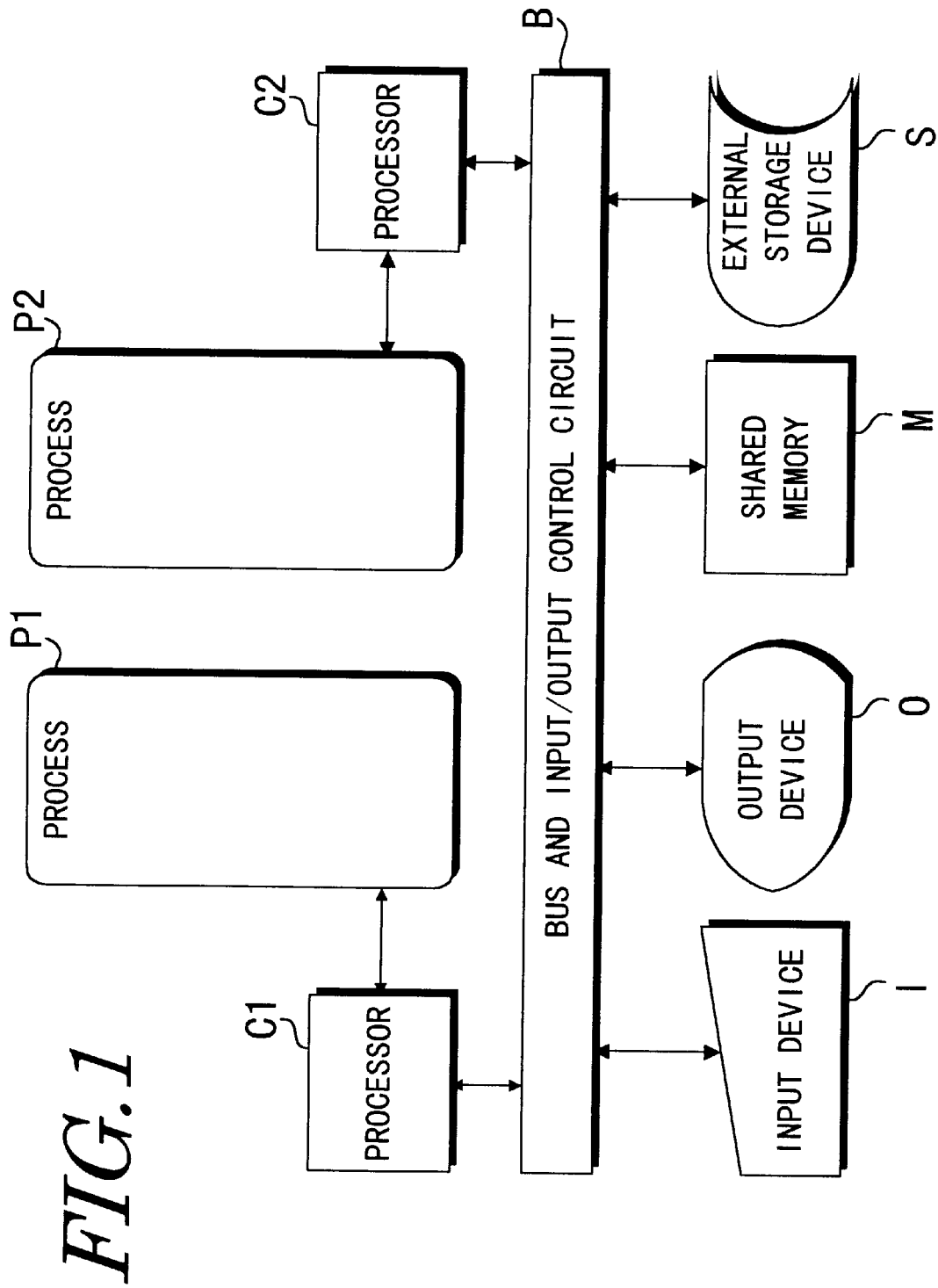
FIG. 1 is a functional block diagram showing the configuration of a computer for implementing the embodiment of this invention.

Also, in this embodiment, a multi-CPU system, which uses a plurality of CPUs, is used, and each process accesses the shared memory. FIG. 1 is a conceptual diagram showing the embodiment of this invention. As shown in this figure, processors C1 and C2 execute processes P1 and P2 simultaneously and concurrently. Depending upon the contents of processes P1 and P2, processors C1 and C2 access the shared memory M, input device I, output device O, and external storage device S via the bus and the input/output control circuit B.

Typically, the input device I is a keyboard or a mouse from which the user enters commands and data. The external storage device S, usually consisting of a hard disk, magnetic disk, or magneto-optic disk, contains source programs or debug status information. The output device O, usually a CRT display or printer, outputs source programs or debug status information in the text or graphic format. The user uses the input device I and output device O to operate a computer interactively. The user may use any number of computers of any size and configuration; for example, a computer may be on a network or in a distributed processing environment.

A concurrent program created according to this invention may be executed on any type of target machine. That is, the program may be executed on what we call a parallel computer which may or may not have shared memory, or it may be executed on a distributed network computer system or on a single-CPU multitasking system. For a single-CPU multitasking system, a plurality of processes may reside in a single CPU.

The host machine used in the embodiment of this invention may be separate from the target machine (cross development environment). In an environment where a program simulator is available, a single-CPU computer may be used.

(1) Configuration

This embodiment corresponds to the programming support systems claimed in claims 1–14, programming support methods claimed in claims 5–18, and the medium containing the programming support program claimed in claims 19–22.

The embodiment is executed on the computer shown in FIG. 1. For example, a program consisting of a single process for implementing the functions of this embodiment is executed on processor C1 or C2.

Figure 2:
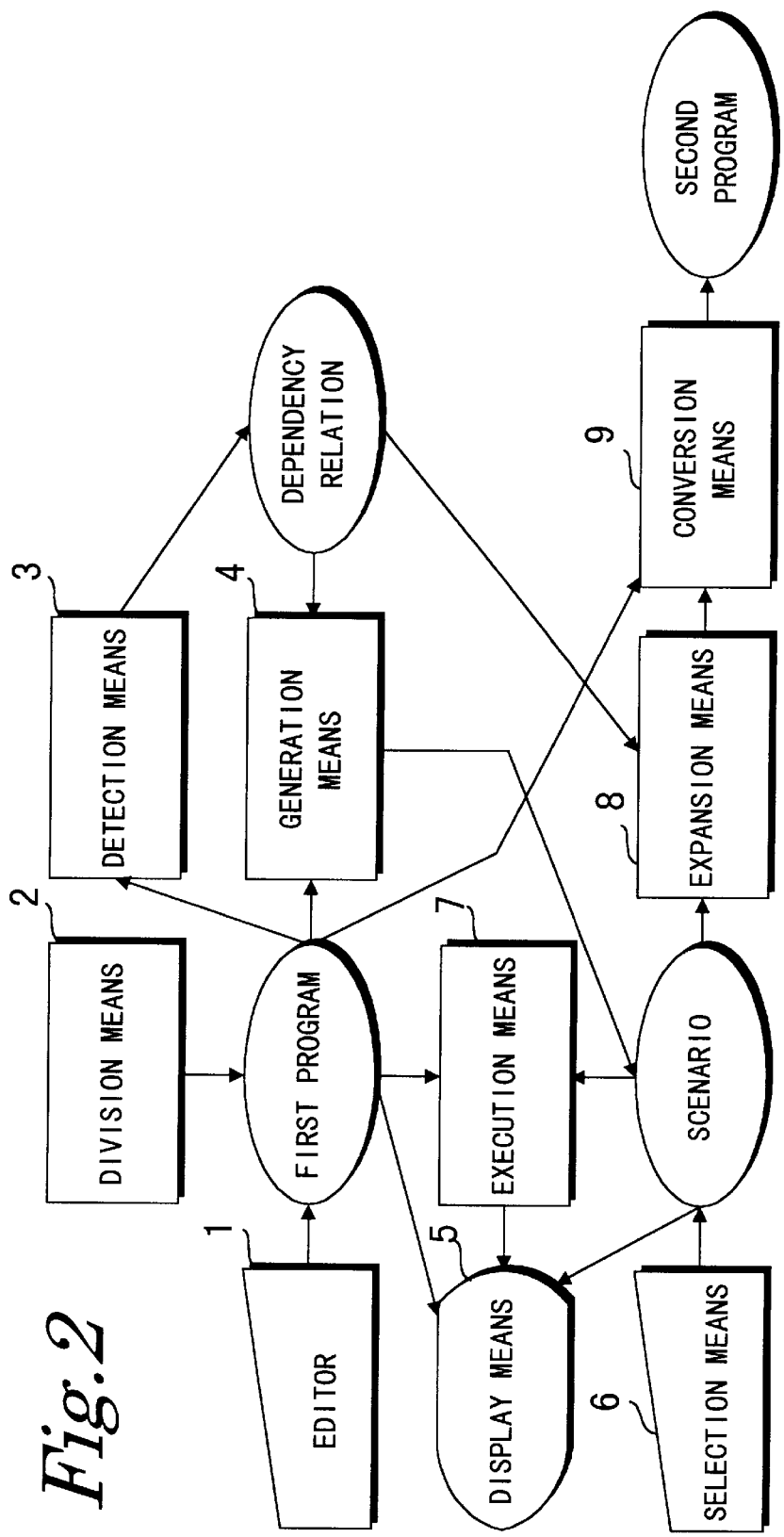
FIG. 2 is a functional block diagram showing the conceptual configuration of the embodiment.

FIG. 2 is a functional block diagram showing conceptually the configuration of this embodiment. As shown in this figure, the system has the editor 1, division means 2, detection means 3, generation means 4, display means 5, selection means 6, execution means 7, expansion means 8, and conversion means 9.

The editor 1 enables the user to create and edit the first program containing a plurality of processes to be executed on the computer. The division means 2 divides each process of the first program into execution controllable sections. The division means 2 divides a process into sections and assigns an interruptible point (hereafter called "scenario point") to each process of the first program.

The detection means 3 detects a dependency (preceding constraint) among sections in different processes. It detects the dependency as follows. When an instruction to change a target in a process is issued, the detection means 3 detects all the instructions that will be affected by the status of the same target. And, the detection means 3 determines that there is a dependency between the instruction that has changed the target and all the affected instructions.

For example, there is a dependency between an instruction that writes data into the shared memory and an instruction that reads data from the shared memory. Similarly, there is a dependency between an instruction that changes a flag shared among processes and an instruction that checks a condition according to the status of the flag. Conversely, there is no dependency between instructions that read data from memory. No dependency is associated with a subroutine reading data only from the memory that is local to a specific processor.

The generation means 4 generates an execution path (a scenario) representing the control branches between sections in order to indicate all the possible execution sequences of the sections in each process. A scenario contains the behaviors of only those essential test cases the designer expects to occur. A test case used in the embodiment of this invention differs from that used in the prior art in that internal behaviors are described as well as input/output from or to the outside. That is, in a concurrent program, there is a large number of paths depending upon the context of each instruction. The fact is that testing all the cases is virtually impossible and that the significant paths are only some of them. This scenario is represented in a known method; for example, the method introduced in "Structural Testing of Concurrent Programs" (Richard N. Taylor et al., IEEE TRANSACTIONS ON SOFTWARE ENGINEERING, VOL 18, NO. 3, MARCH 1992) is used.

This type of scenario may be represented as a network-structured state transition diagram. In the state transition diagram, a node representing a state is connected, via a branch edge representing an executable section, to the next node representing the next state.

A scenario may be represented in a tree-structured diagram. However, though a plurality of paths, each executing the same number of instructions in a separate sequence, are combined after execution, the number of paths remains the same. For example, when executing instructions a, b, and c, two branches, a→b→c and b→a→c, are combined after execution, the number of paths remains unchanged. Therefore, the network-structured scenario is easier to understand. In each scenario, there is the same number of paths as there are execution sequences in each section in each process.

The display means 5 displays the first program and various types of data including a scenario. A scenario generated by the generation means 4 is output on the display means 5. Various types of information may also be output on an output device, such as a printer.

The selection means 6 allows the designer to select, from those branches in a scenario generated by the generation means 4, the sections for the branches having a dependency. That is, when a scenario is displayed on the display means 5, the designer uses the selection means 6 to select sections for the branches associated with the dependency.

The execution means 7 simulate the first program based on the execution sequence among sections selected by the selection means 6. The result of this simulation is displayed on the display means 5.

The expansion means 8 derives the behaviors equivalent to the above scenario based on the dependency and expands the scenario so that those behaviors can be performed. More specifically, the expansion means 8 expands the scenario by adding branches of non-dependent sections. These non-dependent branches bring a harmless nondeterminism into the program.

The conversion means 9 converts the first program based on the scenario expanded by the expansion means 8, and generates the second program. That is, based on the expanded scenario, the conversion means 9 converts the first program to the second program which executes a sequence of sections in a selected sequence. This conversion is performed so that only the behaviors indicated by the scenario are executed. More specifically, the conversion means 9 inserts synchronization instructions into the source code to control the behaviors.

The concrete example of the configurations of the expansion means 8 and the conversion means 9.

Figure 3:
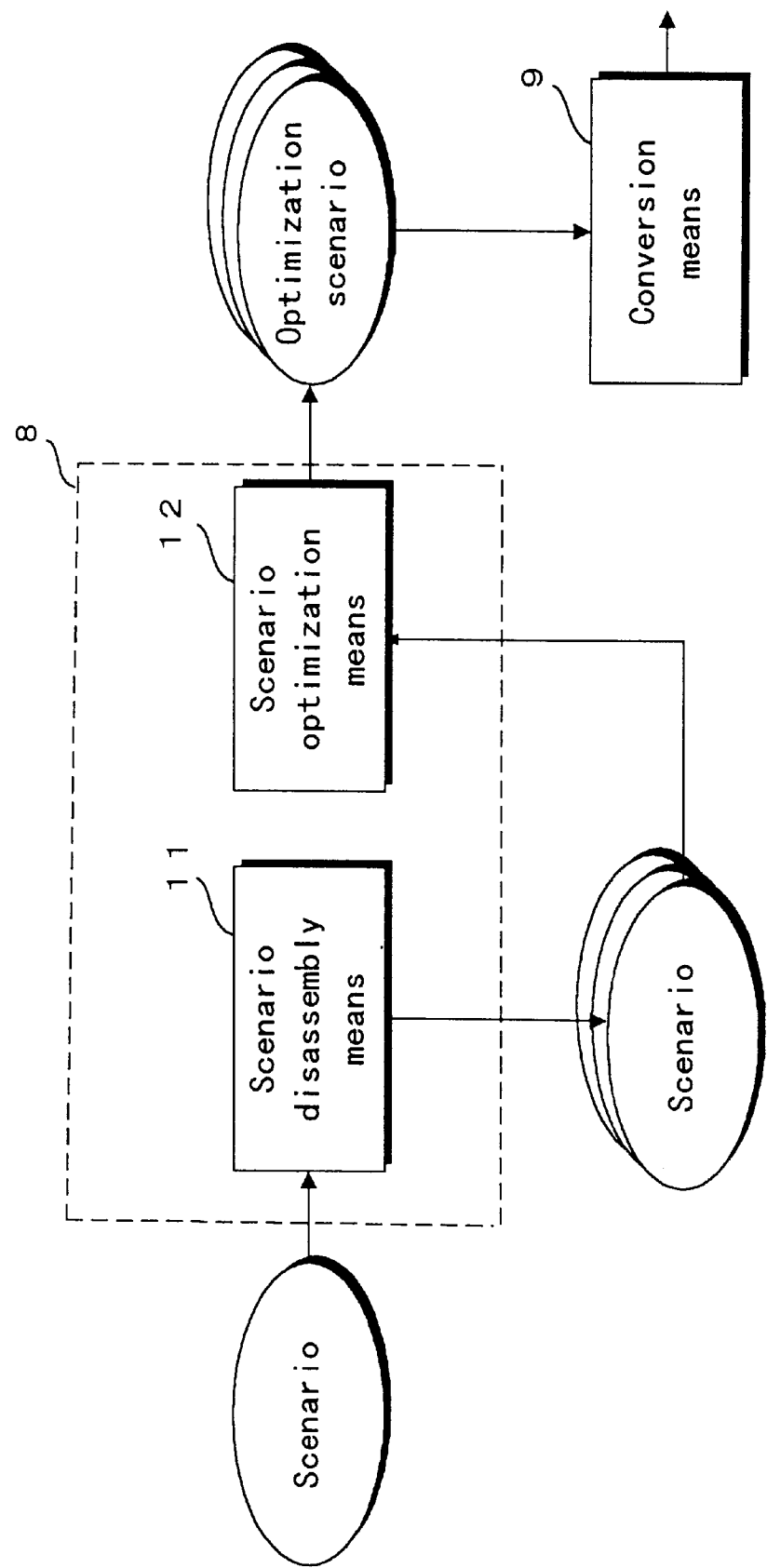
FIG. 3 is a functional block diagram showing the configuration of the conversion means 9 used in this embodiment.

FIG. 3 is a functional block diagram showing conceptually the configuration of the expansion means 8 and the relation between the expansion means 8 and the conversion means 9. The expansion means 8 has the scenario disassembly means 11, and scenario optimization means 12. The scenario disassembly means 11 disassembles the scenario described above, according to the first program to produce a scenario for each process. The scenario disassembly means 11 not only disassembles simply a scenario but also adds information for synchronizing the scenarios (synchronization instruction) so that the initial scenario may be reproduced from a set of disassembled scenarios.

The following explains how the scenario disassembly means 11 disassembles a scenario represented by a directed graph. FIGS. 4 and 5 show the procedure by which the scenario disassembly means 11 inserts synchronization instructions. In these figures, an arrow indicates the execution of an instruction in a process, and the status before and after instruction execution is indicated by a circular node. FIG. 4 shows a procedure in which there is no shared variables, while FIG. 5 shows a procedure in which there are shared valuables.

Figure 4A:
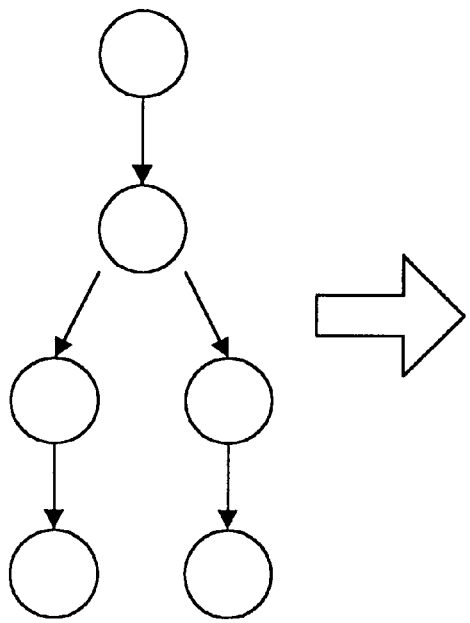
FIGS. 4(a) and 4(b) are diagrams showing how the scenario disassembly means 11 inserts synchronization instructions in this embodiment.
Figure 4B:
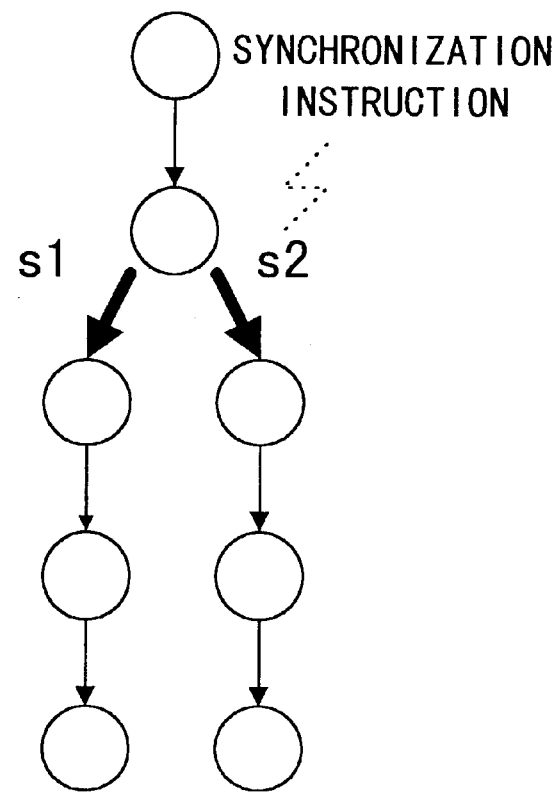
Figures 5A, 5B:
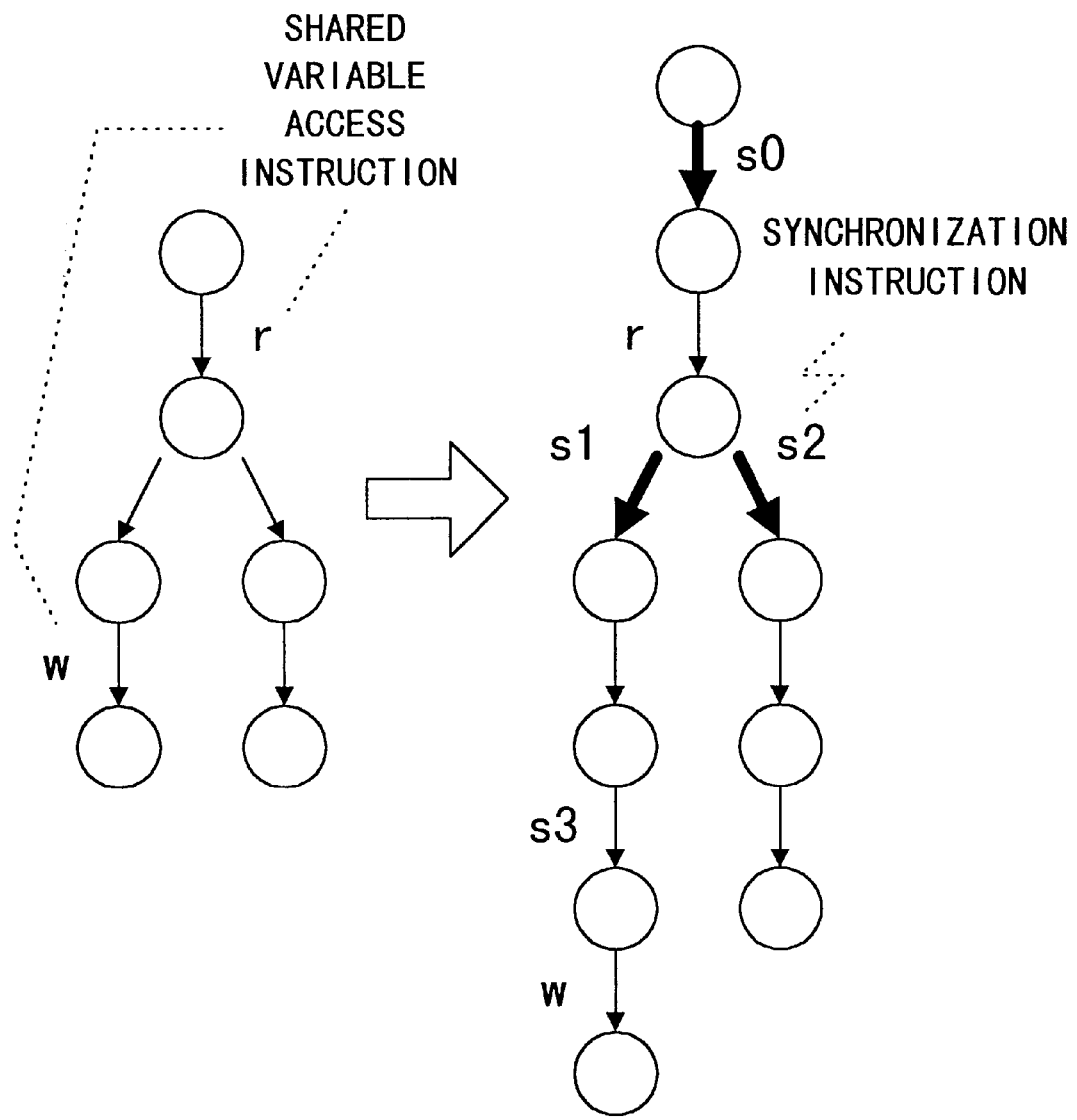
FIGS. 5(a) and 5(b) are diagrams showing how the scenario disassembly means 11 inserts synchronization instructions in this embodiment.

Assume that, in FIG. 4(a), all the processes will not access shared variables. In this case, the synchronization instruction is inserted after all the branches in the directed graph, as shown in FIG. 4(b). Because a branch occurs at the second node in the scenario shown in this figure, the synchronization instructions s1 and s2 are inserted. Next, assume that, in FIG. 5(a), the instructions r and w will access shared variables. In this case, the synchronization instructions s0 and s3 are inserted before the instructions r and w, and synchronization instructions s1 and s2 are inserted after the branch.

For the scenario inserted synchronization instructions in this manner, the scenario disassembly means 11 generates a scenario for each process. This scenario consists of the instructions initially owned by each process and synchronization instructions.

Figure 6:
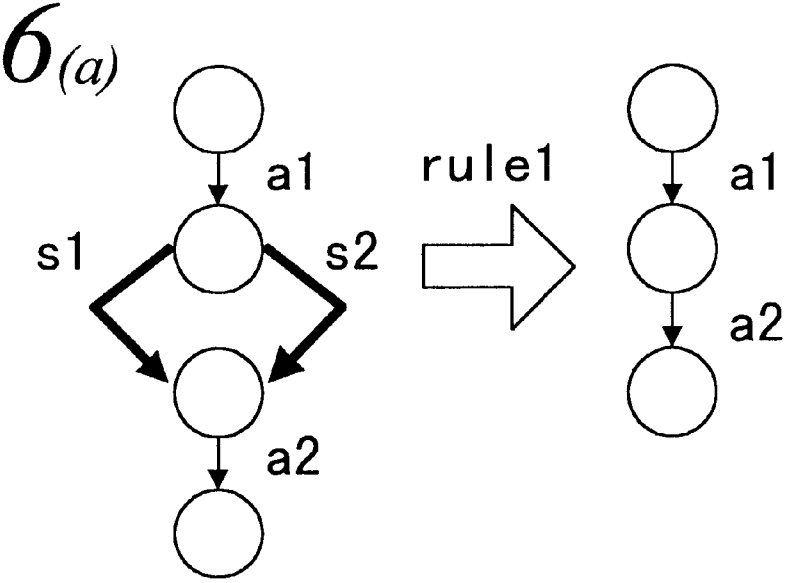
FIGS. 6(a), 6(b) and 6(c) are diagrams showing the graph reduction rule used in this embodiment.
Figure 6:
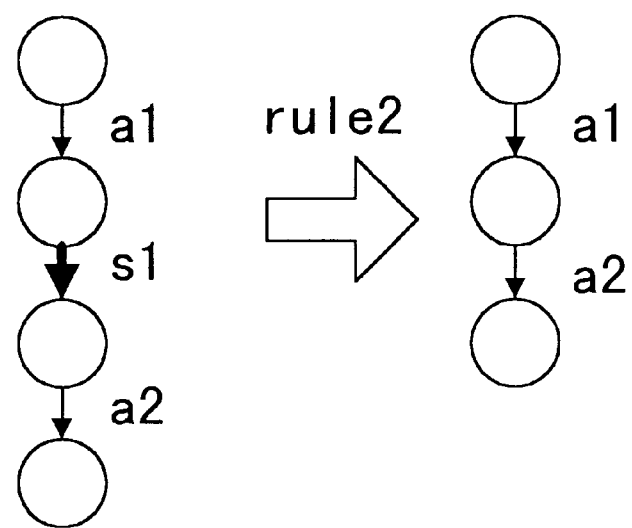
Figure 6:
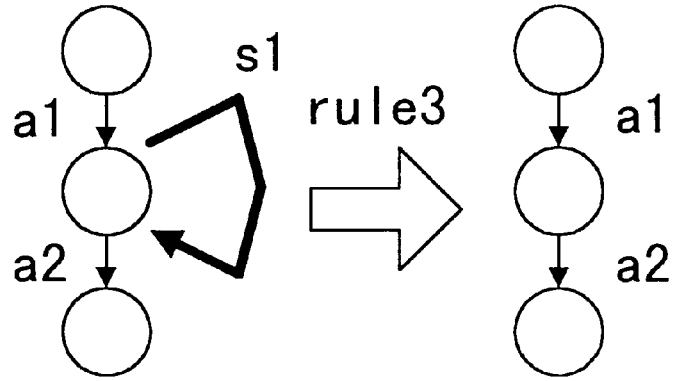
Figure 7A:
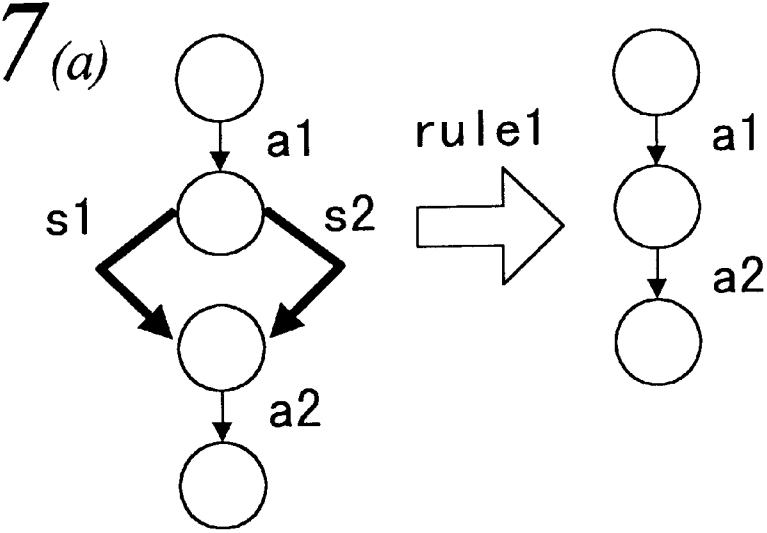
FIGS. 7(a), 7(b) and 7(c) are diagrams showing the graph reduction rule used in this embodiment.
Figure 7B:
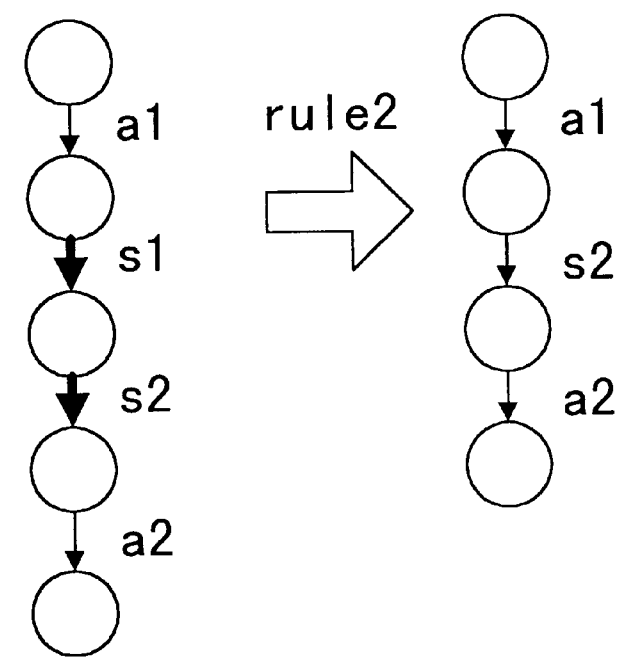
Figure 7C:
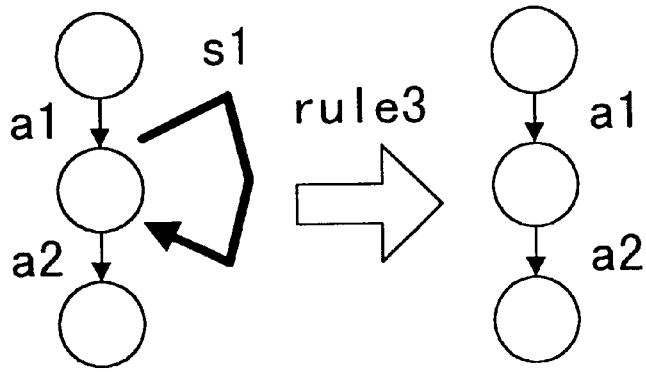

The scenario optimization means 12 analyzes the first program and, if it finds that the scenario for each process has a redundant part, removes it and generates the optimized scenario (optimized scenario). More specifically, the scenario optimization means 12 deletes redundant synchronization instructions and remains only the necessary ones. To do so, the scenario optimization means 12 uses the graph reduction rule. FIGS. 6 and 7 show and example of the graph reduction rule. FIG. 6 shows an example containing no shared variables shared by processes, while FIG. 7 shows an example containing shared variables. The rule described below may be coded as a program as described below.

First, the following explains an example, shown in FIG. 6, in which there is no shared variables shared by processes. If the branch synchronization instructions s1 and s2 have been inserted after the instruction a1, whose destinations are same, and if there is no synchronization instruction other than s1 and s2 as shown in FIG. 6(*a*), then the scenario optimization means 12 deletes synchronization instructions s1 and s2 (rule 1). If the synchronization instruction s1 has been inserted between the instruction a1 and instruction a2 without branch, and if there is no synchronization instruction other than the synchronization instruction s1 as shown in FIG. 6(*b*), then the scenario optimization means 12 deletes this synchronization instruction (rule 2). If the branch and loop synchronization instruction s1 has been inserted after the instruction a1 and if there is no synchronization instruction other than the synchronization instruction s1 as shown in FIG. 6(*c*), then the scenario optimization means 12 deletes the synchronization instruction s1 (rule 3). If all the synchronization instructions are deleted from other processes, the scenario optimization means 12 deletes the corresponding synchronization instructions (rule 4).

Next, the following explains an example, shown in FIG. 7, in which there is a shared variables shared by processes. If the branch synchronization instructions s1 and s2 have been inserted after the instruction a1, whose destinations are same, if there is no synchronization instruction other than s1 and s2, and if the instruction a2 does not access the shared variable as shown in FIG. 7(*a*), then the scenario optimization means deletes synchronization instructions s1 and s2 (rule 1). If the synchronization instructions s1 and s2 have been inserted between the instruction a1 and instruction a2 without branch, and if there is no synchronization instruction other than the synchronization instructions s1 and s2 as shown in FIG. 6(*b*), then the scenario optimization means 12 deletes only the synchronization instruction s2 (rule 2). If the branch and loop synchronization instruction s1 has been inserted after the instruction a1, and if there is no synchronization instruction other than the synchronization instruction s1 as shown in FIG. 6(*c*), then the scenario optimization means 12 deletes the synchronization instruction s1 (rule 3). If synchronization instructions are deleted from other processes, the scenario optimization means 12 deletes the corresponding synchronization instructions in this process (rule 4).

The conversion means 9 generates from the optimized scenario the second program which reproduces only the scenario and the behavior expanded from that scenario. More specifically, the conversion means 9 generates the second program by adding the synchronization instructions, not deleted in the optimization process described above, to the source program.

(2) Operation and effects

Figure 8:
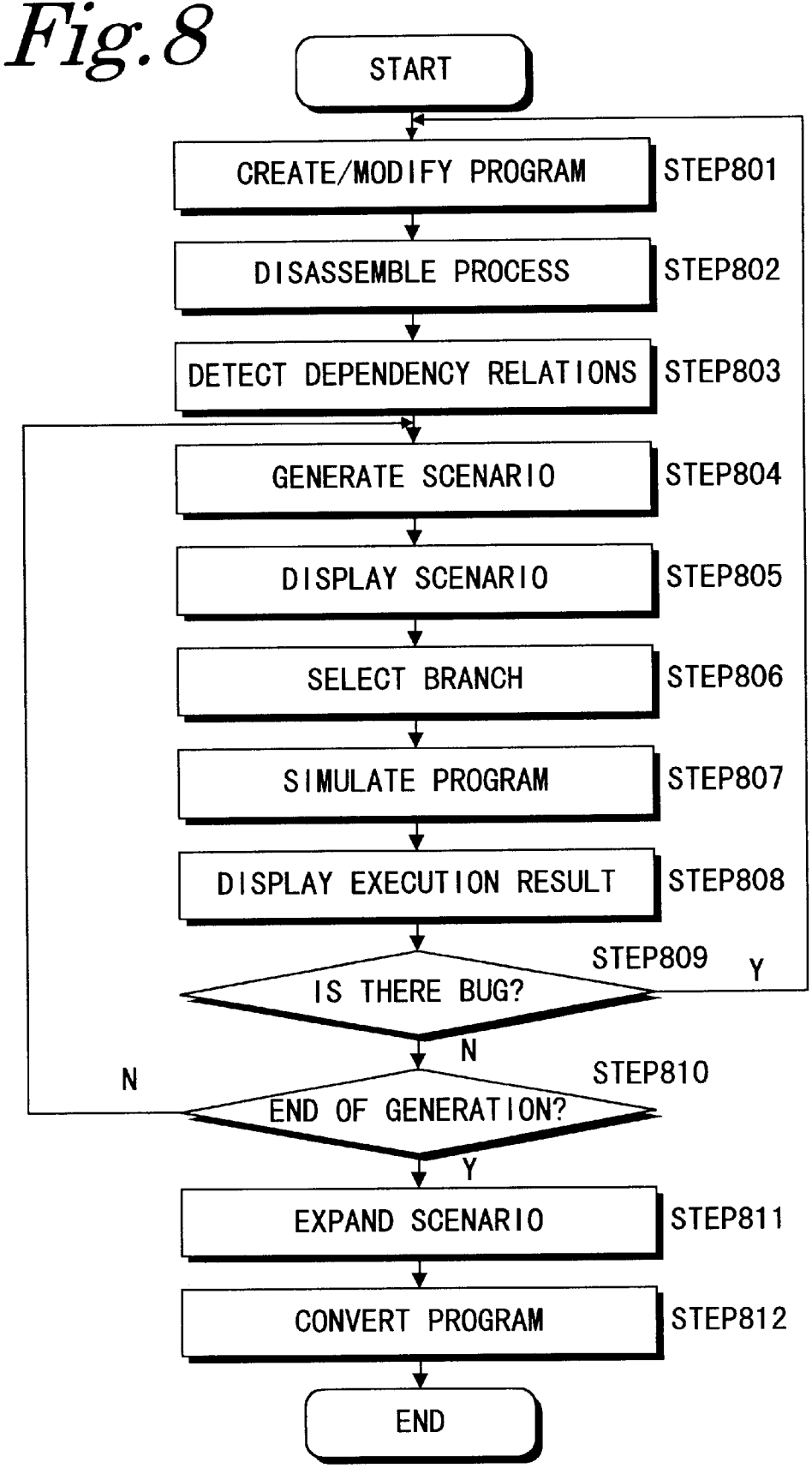
FIG. 8 is a flowchart showing the programming procedure used in this embodiment.

Programming in the embodiment having this configuration is performed according to the following procedure. FIG. 8 is a flowchart showing the flowchart for programming in this embodiment.

Program creation

First, the designer creates a program with the use of the editor 1 (step 801). To do so, the designer creates the program, for example, by modeling the target concurrent system naturally with concurrency and coding the structure and behavior of the processes of the model. At this point, the first program may have errors.

Table 1 shown below shows an example of the source code of processes P1 and P2 constituting the sample concurrent program:

TABLE 1

| P1: | |
|---|---|
| begin | |
| init1; | /*Initialize memory M*/ |
| read1; | /*Read from memory M*/ |
| write1; | /*Write into memory M*/ |
| end | |
| P2: | |
| begin; | |
| read2; | /*Read from memory M*/ |
| write2; | /*Write into memory M*/ |
| end | |

Figure 9:
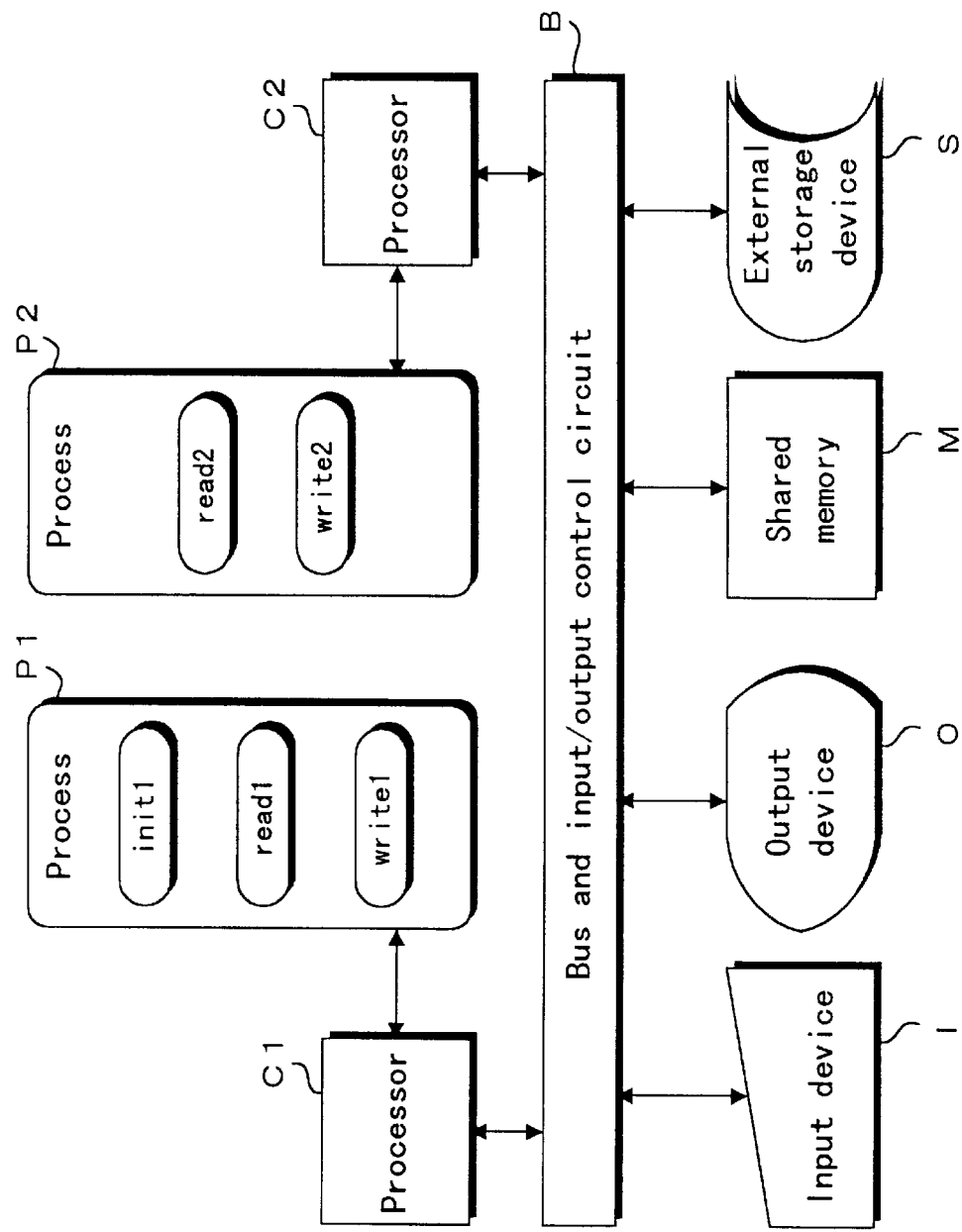
FIG. 9 is a conceptual diagram showing the initial correspondence between processes P1 and P2 and the processors C1 and C2.

Because there is no control relation between processes P1 and P2 in this example, there is an unexpected harmful nondeterminism in the execution sequence of the instructions in each process. FIG. 9 is a conceptual diagram showing the status of processes P1 and P2 corresponding to processors C1 and C2.

Process division

After the program is created, the division means 2 divides each of the processes P1 and P2 of the first program into executable sections (step 802). To do so, the division means 2 sets scenario points in the processes P1 and P2 of the first program.

The division means 2 divides each of the processes P1 and P2 by setting interruptible points (hereafter called "scenario points") in each of them. A scenario point may be set before or after each instruction or, for a sequence of local processes in a process, before or after the process, not in the middle of the process.

Note that an area between two scenario points, which is uninterruptible, cannot be controlled using synchronization signals. As a result, an area between two scenario points is treated as a section. In the following discussion, assume that scenario points are set so that each instruction forms one section and that the name of the instruction word itself is used as the section name. Also note that a synchronization instruction that appear in a process, which generates an interrupt explicitly, is also treated as a scenario point automatically.

Dependency detection

Next, the detection means 3 detects dependency relations among processes (step 803) and stores them in a memory area. That is, when the detection means 3 detects an instruction which will change a target in a process, it detects all the instructions that will be affected by the change in that target. The detection means 3 assumes that there is a dependency relation between the instruction that changes the target and all the instructions that will be affected by the change.

For example, when a process issues an instruction that writes data into the shared memory, the detection means 3 detects all the instructions in all the processes that will read that data. If there is such a write instruction, it is assumed that there is a dependency relation between the write instruction and the read instruction.

In the following discussion, assume that the following dependency relations are detected:

TABLE 2

| init1 and read2, write2 |
| read1 and write2 |
| write1 and read2, write2 |

Scenario generation

Figure 10:
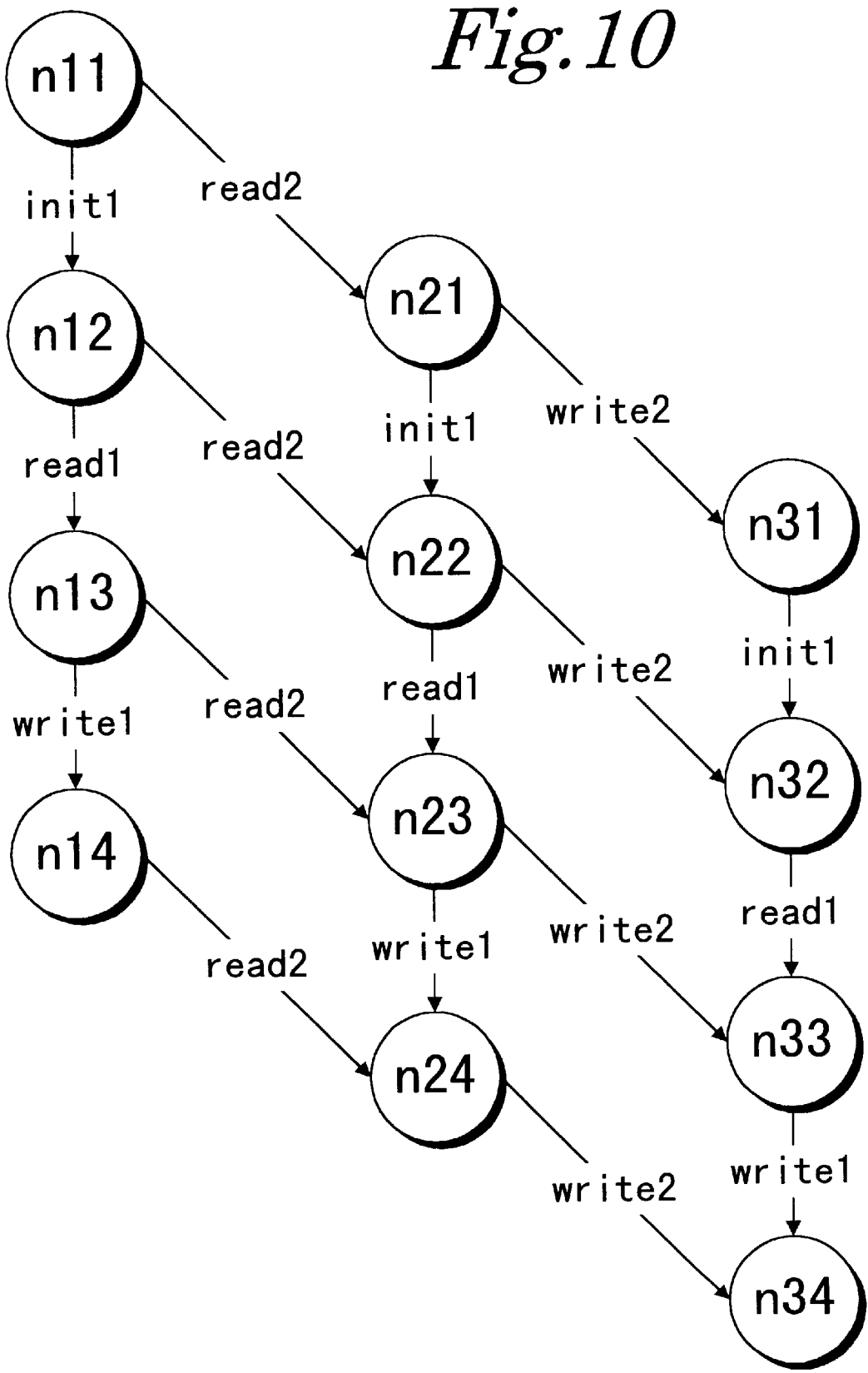
FIG. 10 is a state transition diagram showing all the possible paths in the program shown in Table 1 used in this embodiment.

Next, the generation means 4 generates a scenario (step 804). FIG. 10 is an example of scenario which shows all the possible paths of the program, shown in Table 1, in the state transition diagram. A state transition diagram representing a scenario like this is called a scenario graph. In this figure, an arrow indicates the execution of an instruction, and a circle indicates the state before and after the execution of an instruction. The scenario graph in FIG. 10 shows all the possible transition paths. There are ten such paths.

In this embodiment, a scenario contains only the branches between dependent sections, not the branches between non-dependent sections. For example, because there is no dependency between read1 and read2 at node n12 in FIG. 10, the same result is obtained regardless of which read instruction is executed first. Therefore, the generation means 4 generates an arrow edge only for read1, but not for read2.

Branch selection

Next, the scenario generated as described above is displayed on the display means 5 (step 805). For the sections with no dependency relation, one of them is displayed as described above. Though, for the branches of the selections without a dependency relation, only one of the branches is displayed as described above, for the branches of the sections with a dependency relation, the designer selects one of the sections with the selection means 6 (step 806).

For example, at node n11 shown in FIG. 10, there is a dependency relation between init1 and read2. In this case, the two edges, one between node n11 and section init1 and the other between node n11 and section read2, are displayed in boldface. In addition, the window is displayed to prompt the designer to select one of them.

Figure 12:
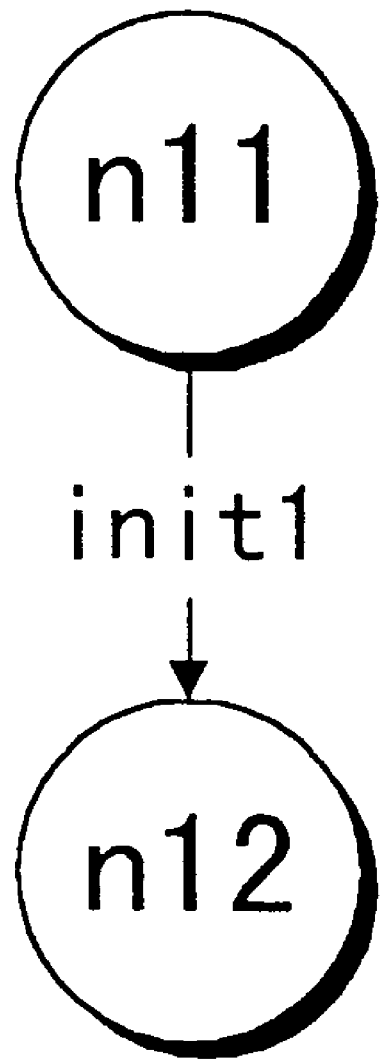
FIG. 12 is a diagram showing the status of the scenario graph when the designer selects, at node n11, init1 as the instruction to be executed first in this embodiment.

In the window, a message as well as an icon representing a selection is displayed. When this window appears, the designer clicks the button to select a section he wants. In this example, assume that the designer selects init1 as the section to be executed first, and read2 as the section to be executed later. If the computer executes read2 before init1, it reads data from memory before initialization, causing program function errors. Then the designer does not select read2 as the one to be executed first. The section not selected is detected. FIG. 12 shows the scenario graph from which the edge between node n11 and section read2 has been deleted.

When an edge is deleted, control will never be passed to one or more nodes whose input come only from the deleted edge. In the above example, nodes n21, n31, n22, and n32 which would be generated if section read2 was selected are not generated. Because there is not a dependency relation between read1 and read2 at node n12, in this case, only the edge to read1 is generated and edge to read2 is omitted at the branch of node n12.

Figure 11:
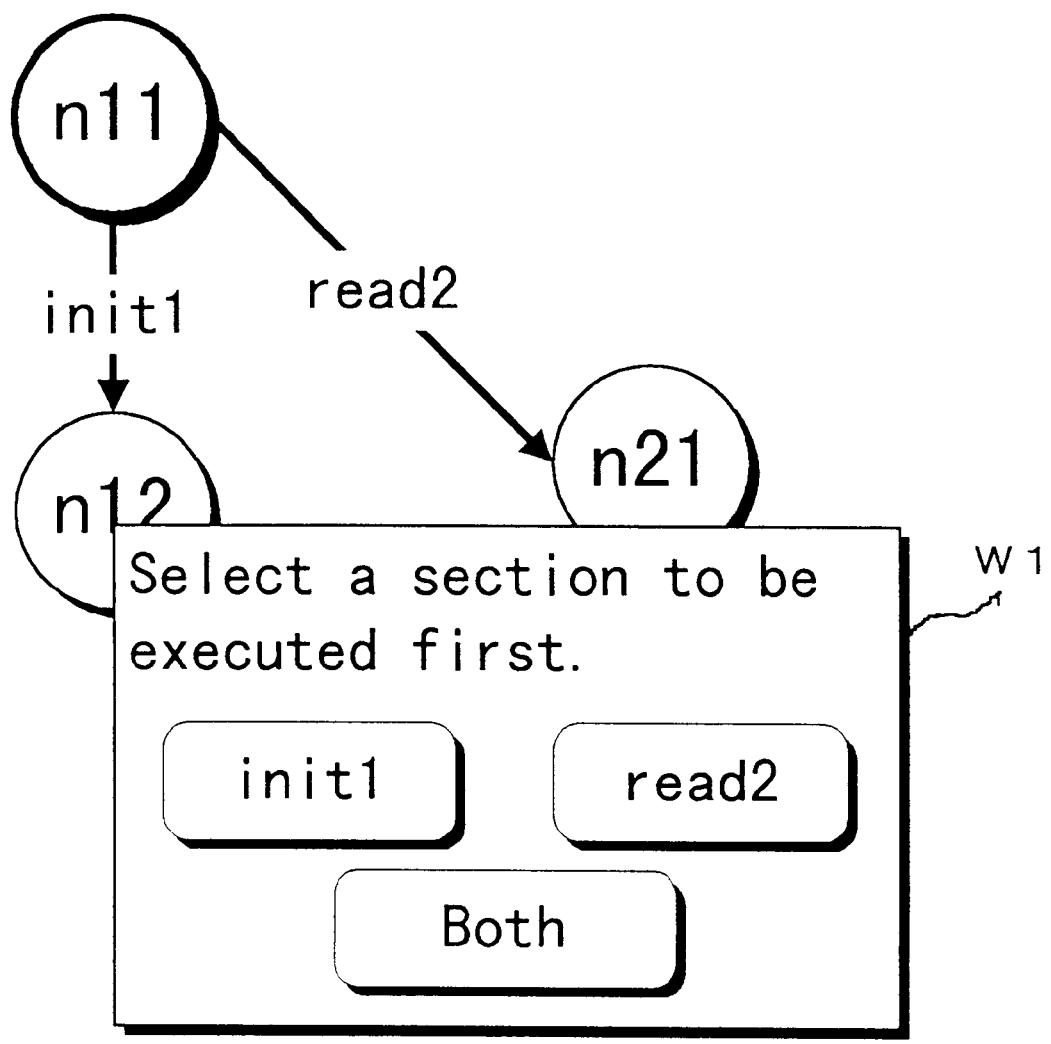
FIG. 11 is a diagram showing an example of the screen prompting the designer to select branch from init1 and read2 at node n11 in this embodiment. .
Figure 13:
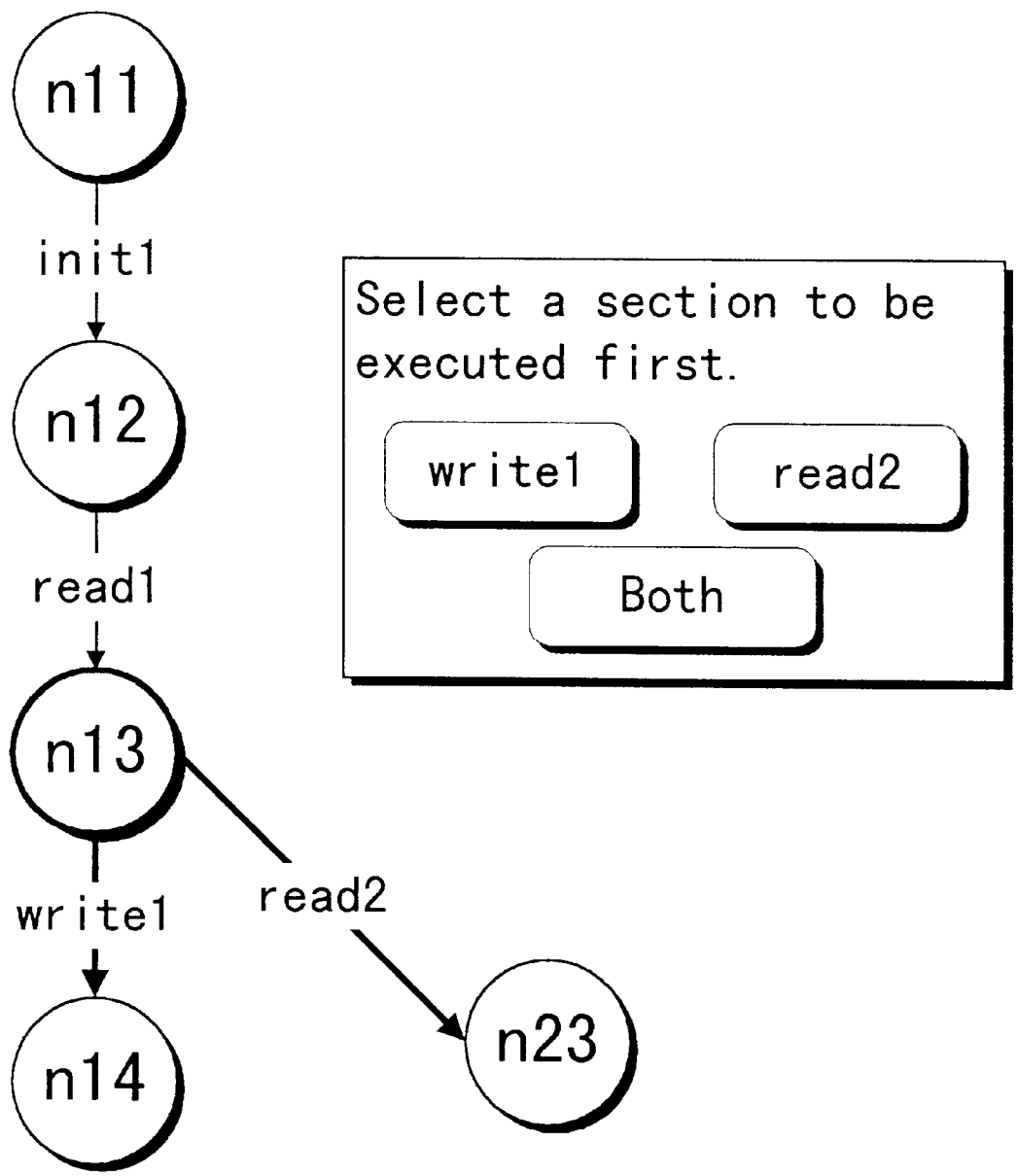
FIG. 13 is a diagram showing an example of the screen prompting the designer to select branch from write1 or read2 at node n13 in this embodiment.

In addition, the designer may select both when there is no dependency relation between sections or when a significant operation is performed regardless of which section is executed first. The icon "Both" in the window shown in FIG. 11 is provided to allow the designer to select this option. FIG. 13 shows an example of the screen prompting the designer to select branch from write1 or read2 at node n13. When the designer selects "Both" in this state, the edges are not deleted but the state shown in FIG. 13 remains unchanged.

Simulation

Next, based on the result of selection, the designer simulates the first program with execution means 7 (step 807). After selecting a section, the designer executes the simulation of the first program. The execution result is displayed on the display means 5 (step 808). Based on the execution result that is displayed, the designer checks if there is a bug in the first program (step 809). If there is no bug and the intended result is obtained and if scenario generation processing is not yet completed (step 810), the designer continues scenario generation processing (step 804). On the other hand, if there is one or more bugs and the intended result is not obtained, the designer modifies the first program to remove bugs with the editor 1 (step 801).

Figure 14:
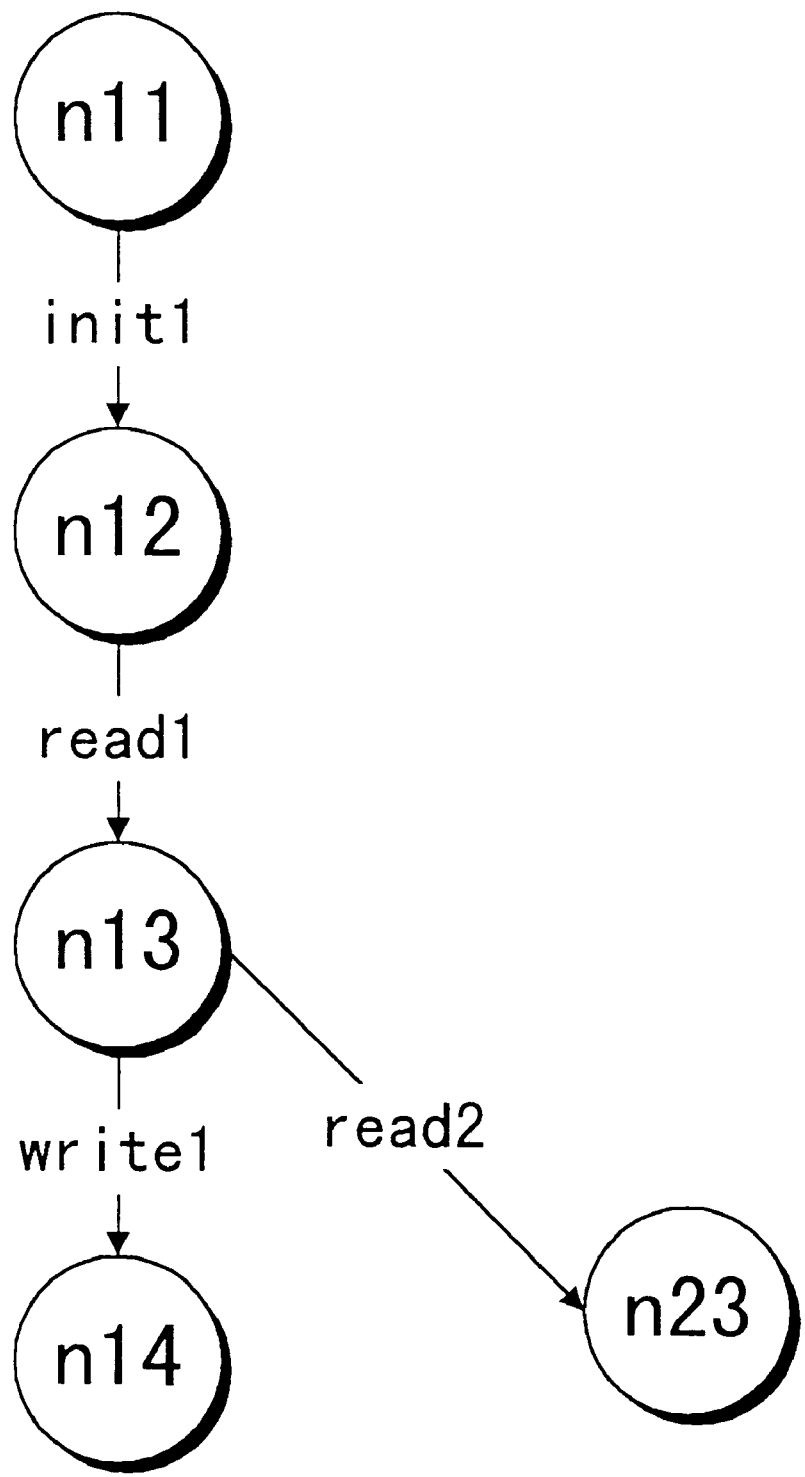
FIG. 14 is a diagram showing the status of the scenario graph when the designer selects both write1 and read2 at node n13 in this embodiment.

For example, when both sections write1 and read2 are selected at node 13 during branch selection (step 806) as shown in FIG. 14, the scenario graph contains the following two scenarios: sn1 and sn2:

TABLE 3

| sn1= |
| nit1 |
| read1 |
| write1 |

TABLE 4

| sn2= |
| init1 |
| read1 |
| read2 |

Figure 15:
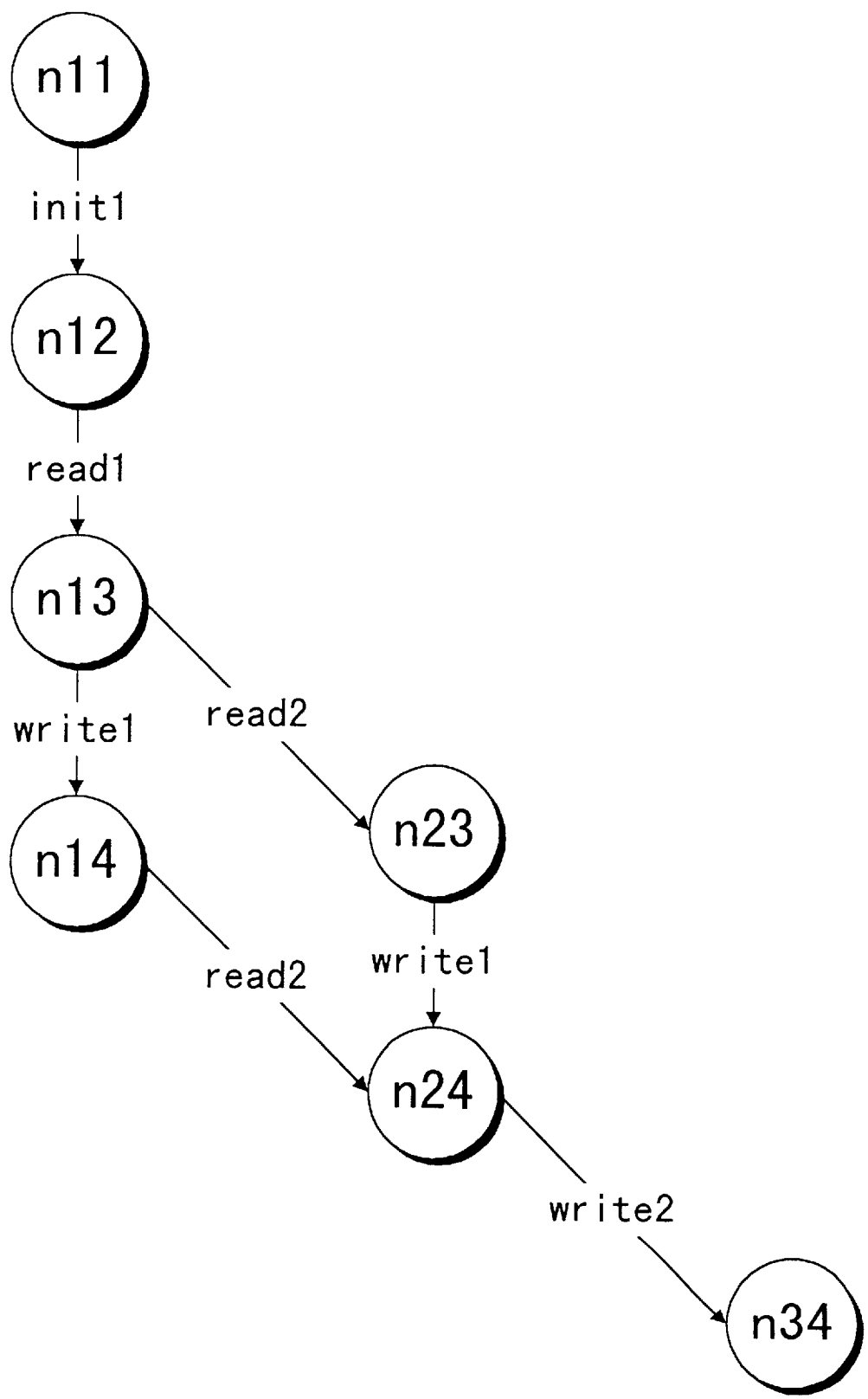
FIG. 15 is a diagram showing the scenario representing the behavior the designer expects in this embodiment.

Therefore, the execution means 7 executes simulation according to these two scenarios: sn1 and sn2. If there is no bug and the intended result is obtained, the scenario shown in FIG. 15 is generated during scenario generation (step 804). Here, it is assumed that there is dependency relation between sections write1 and write2 at node n23 in FIG. 10 and that no edge is generated for section write1 in the same manner as at node n11.

When the state shown in FIG. 15 occurs, the scenario represented on the scenario graph contains the following two path scenarios: sn1 and sn2.

TABLE 5

| sn1= |
| init1 |
| read1 |
| write1 |
| read2 |
| write2 |

TABLE 6 sn2=
init1
read1
read2
write1
write2

Out of a large number of test cases of the concurrent program, this scenario is the essential one representing the behavior of the program the designer intended.

Scenario expansion

Next, the expansion means 8 expands the above scenario by adding a branch between sections with no dependency relation (step 811). More specifically, the expansion means 8 restores an arrow edge and a destination node, which were not generated by the generation means 4 because the detection means 3 had determined that there was no dependent relation.

Figure 16:
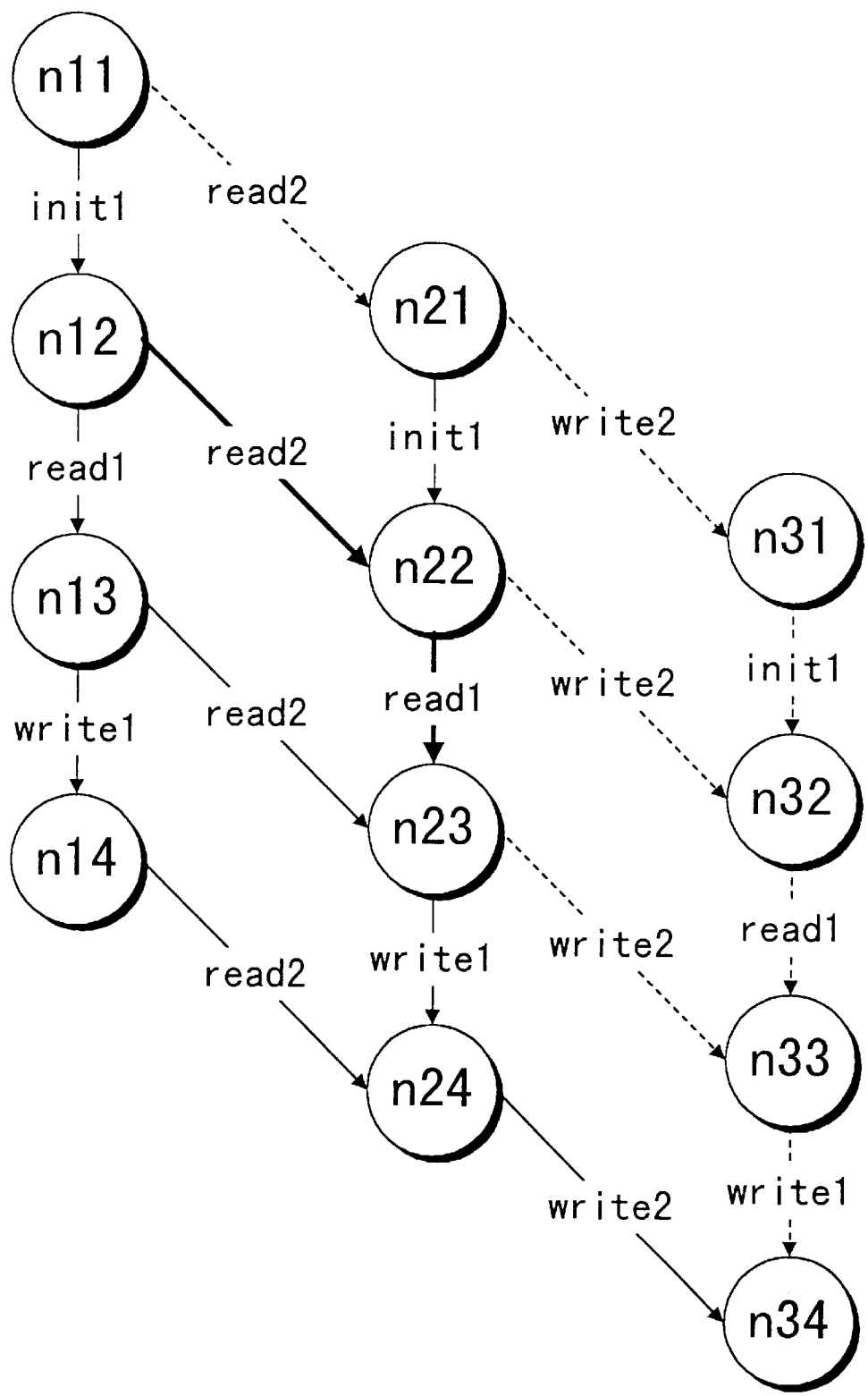
FIG. 16 is a diagram showing the status of the scenario graph in FIG. 15 that has been expanded in this embodiment.

FIG. 16 is a state transition diagram generated by expanding the scenario graph shown in FIG. 15. In this figure, a thin solid-line arrow indicates an edge selected by the designer, a bold solid-line arrow indicates an expanded behavior edge, and a broken-line arrow indicates a behavior edge deleted from the scenario graph. That is, section read2 branched from node n12 and section read1 branched from node n22 are restored.

Figure 17:
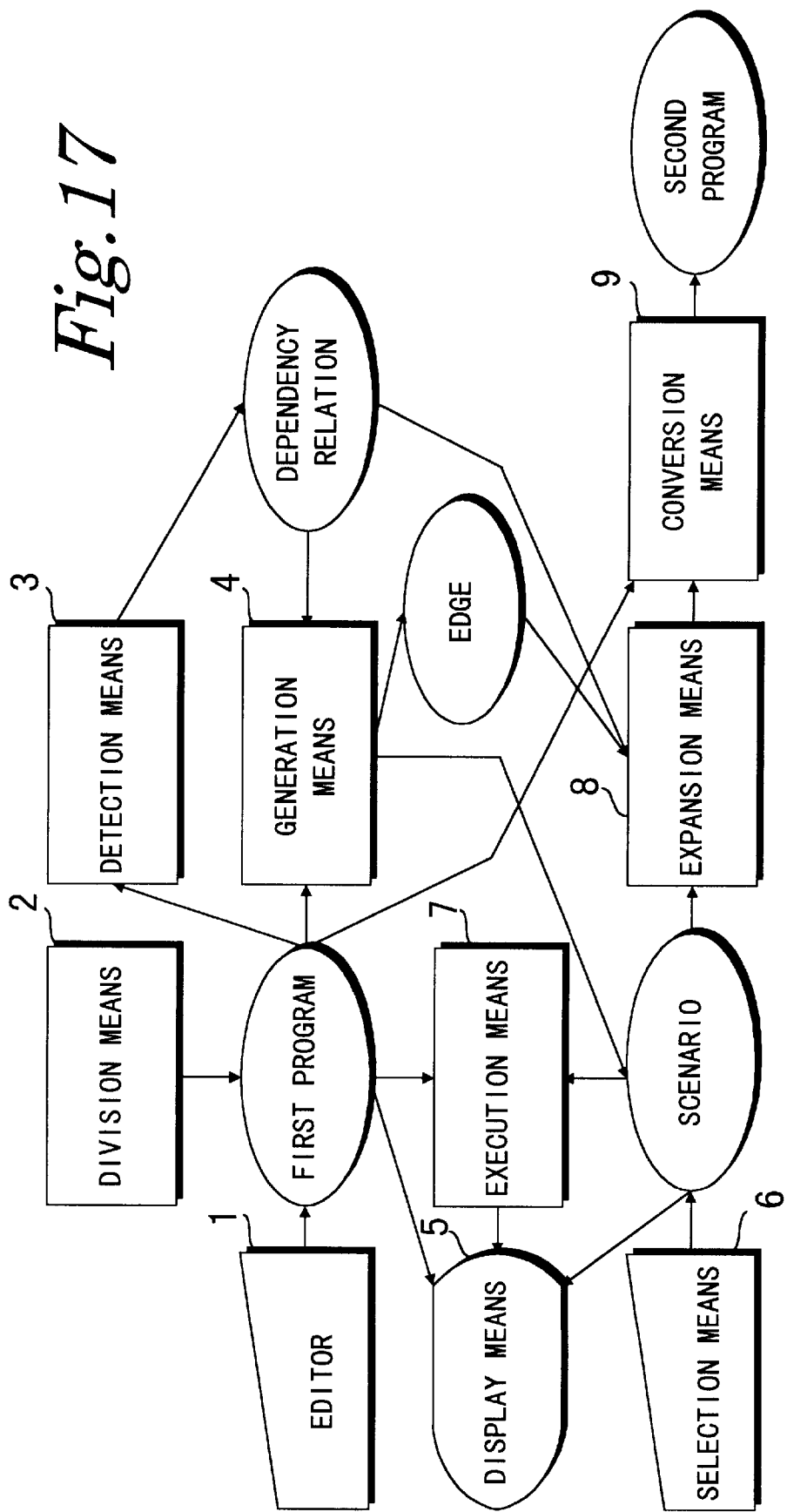
FIG. 17 is a diagram showing an example of how the generation means 4 stores edges in this embodiment.

An edge and a node, not generated by the generation means 4, may be restored based on a dependency relation detected by the detection means 3 as described above. An edge and a node may also be restored by storing information on edges and nodes when the generation means 4 generates the original scenario. That is, as shown in FIG. 17, the generation means 4 stores information on edges into a specified memory area, and the expansion means 8 uses this information to expand the scenario.

The deleted edges and the nodes through which only the deleted edges are connected are shown in FIG. 16 for reference only. Information on these edges and modes may be deleted from memory.

In this way, adding a branch with no dependency relation brings a harmless nondeterminism into a program, increasing the nondeterminism of the second program to be created after conversion and improving program concurrency.

Program conversion

Next, the conversion means 9 converts the first program, based on the scenario obtained as described above, into the second program which will execute a sequence of sections in the selected sequence (step 812).

This conversion is performed by inserting instructions for maintaining synchronization between sections with a dependency relation. That is, the conversion means 9 inserts the send instruction of the synchronization signals among process (send semaphore) after the section that is executed first in all the scenarios, and the wait instruction of the synchronization signals (receive semaphore) before the section that is executed last in all the scenarios. This makes the execution sequence of sections by means the synchronization signals transferred between processes.

The following shows the second program that is generated based on the scenario in FIG. 16.

TABLE 7

| P1: | |
| --- | --- |
| begin | |
| init1; | /*Initialize memory M*/ |
| send (1); | /*Send synchronization signal 1*/ |
| read1; | /*Read from memory M*/ |
| write1; | /*Write into memory M*/ |
| send (2); | /*Send synchronization signal 2*/ |
| end | |
| P2: | |
| begin | |
| wait (1); | /*Wait for synchronization signal 1*/ |
| read2; | /*Read from memory M*/ |
| wait (2); | /*Wait for synchronization signal 2*/ |
| Write2; | /*Write into memory M*/ |
| end | |

Figure 18:
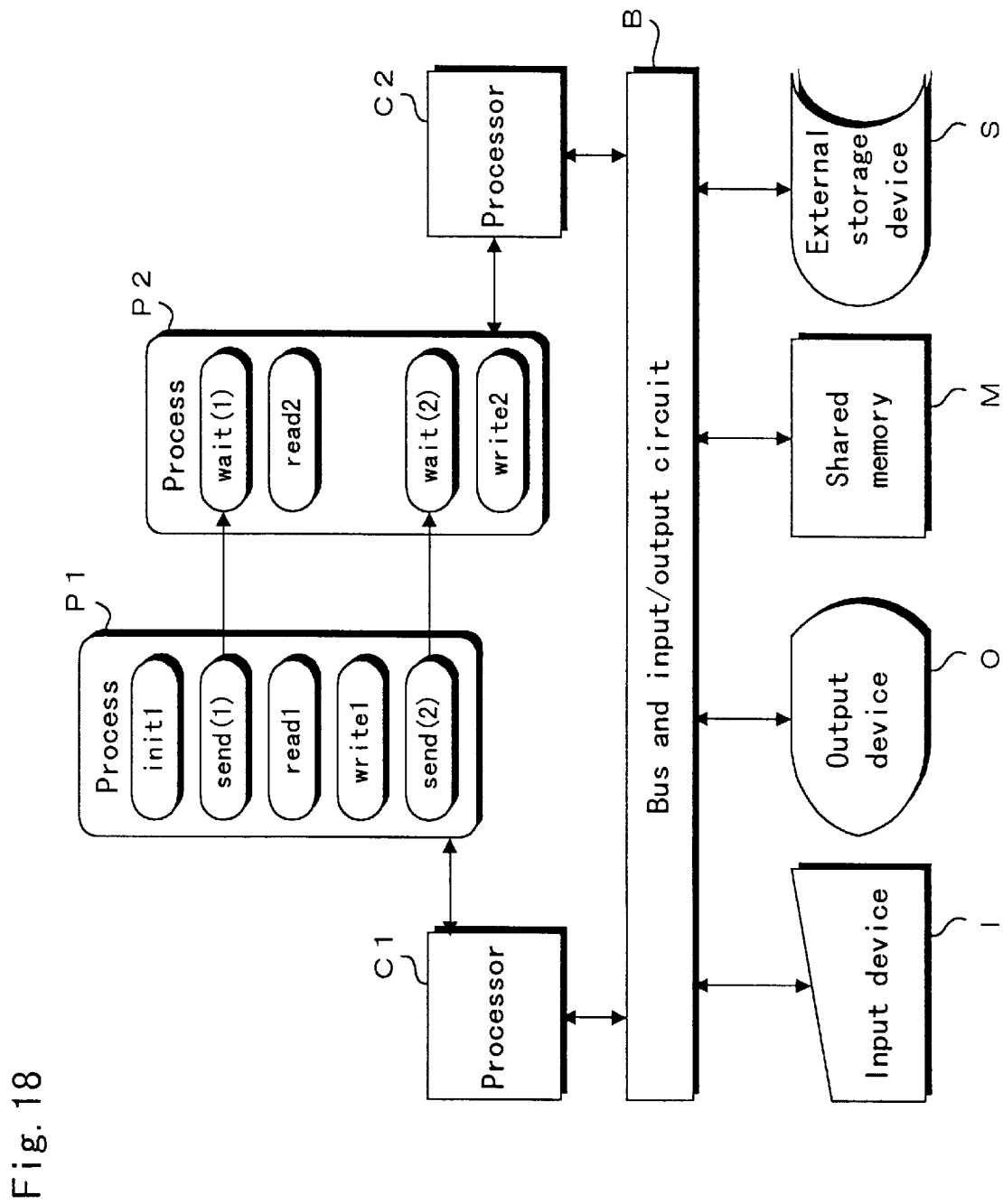
FIG. 18 is a conceptual diagram showing how each process of the second program shown in Table 7 is executed based on the timing set up by the synchronization instructions in this embodiment.

FIG. 18 is a conceptual diagram showing how the processes of the second program shown in Table 7 is executed according to the timing established by synchronization instructions. In this diagram, read2 in process P2 is executed always after init1 in process P1. This corresponds to the fact that, at n11 in FIG. 16, init1 is selected before read2.

Also, in FIG. 18, write2 in process P2 is executed always after write1 in process P1. This corresponds to the fact that, at node n23 in FIG. 16, write1 is selected before write2.

Also, in FIG. 18, there is a nondeterminism for the relation between section read2 in process P2 and sections read1 and write1 in process P1. This corresponds to the fact that, in FIG. 16, there is an edge labeled "read2" from nodes n12, n13, and n14 that are associated with read1 and write1. This keeps a harmless nondeterminism, including a intended nondeterminism, in the concurrent program.

The following explains how the expansion means 8 and the conversion means 9 performs processing. In the following discussion, assume that the first program shown in FIG. 19 is generated for steps 801–810 in FIG. 8. That is, FIG. 19 shows the source code of process P1 and P2 of the first program.

Figure 20:
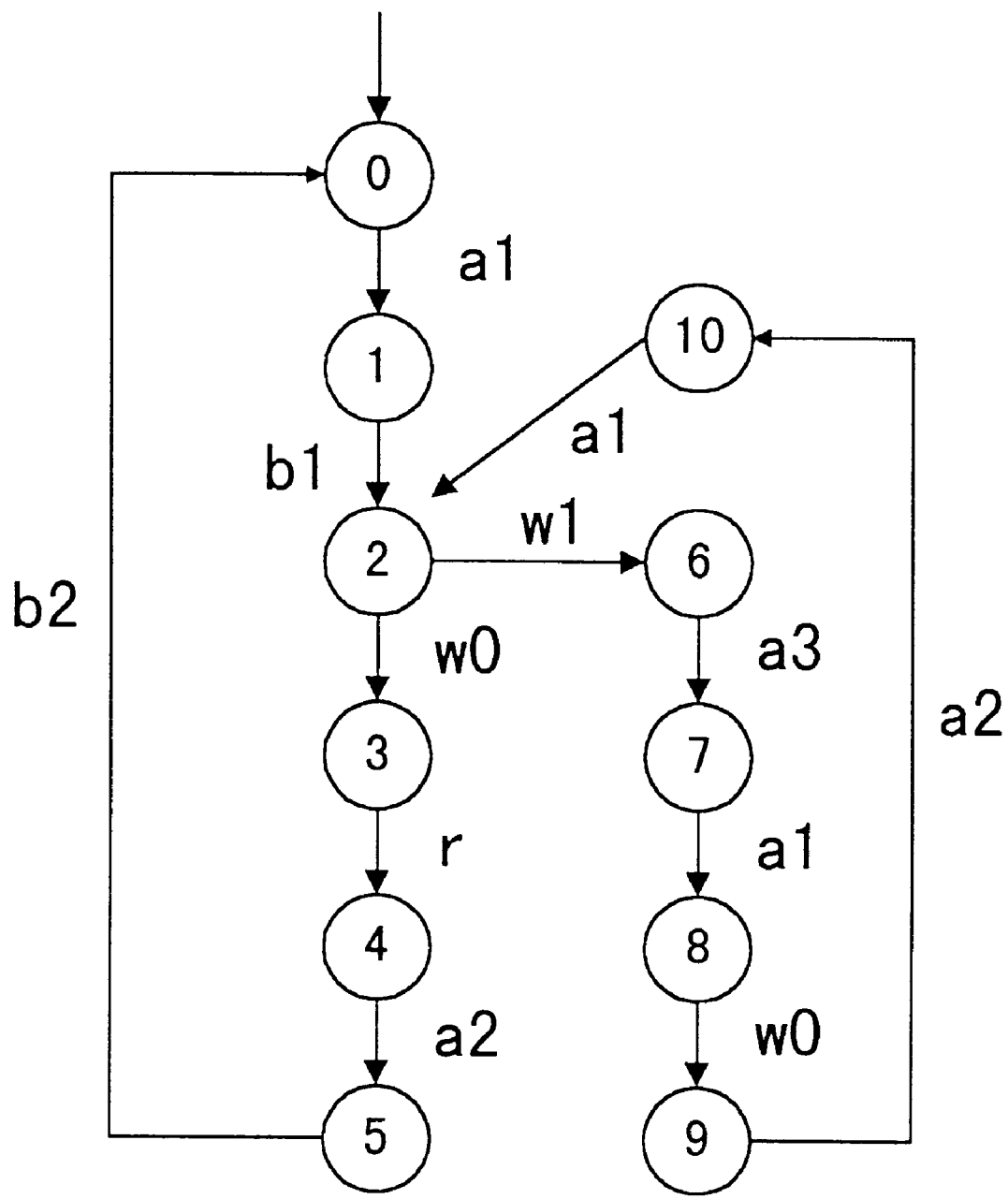
FIG. 20 is a diagram showing an example of the scenario graph generated based on the first program, shown in FIG. 19, used in this embodiment.
Figure 21:
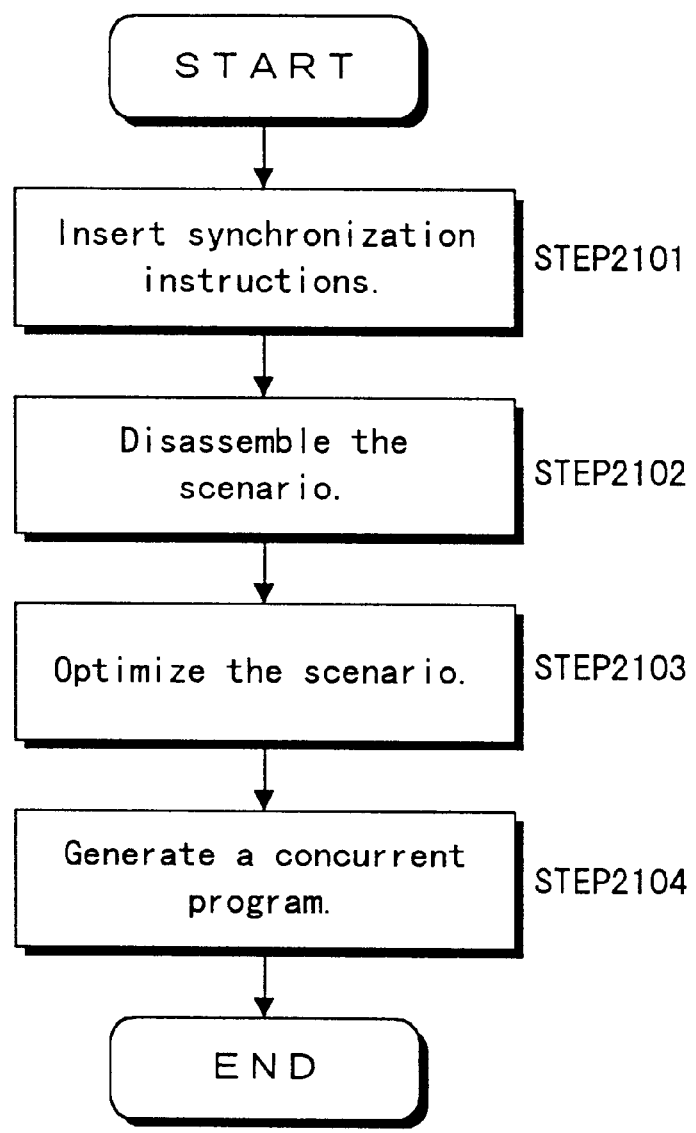
FIG. 21 is a flowchart showing the operation of the expansion means 8 and conversion means 9 used in this embodiment.
Figure 22:
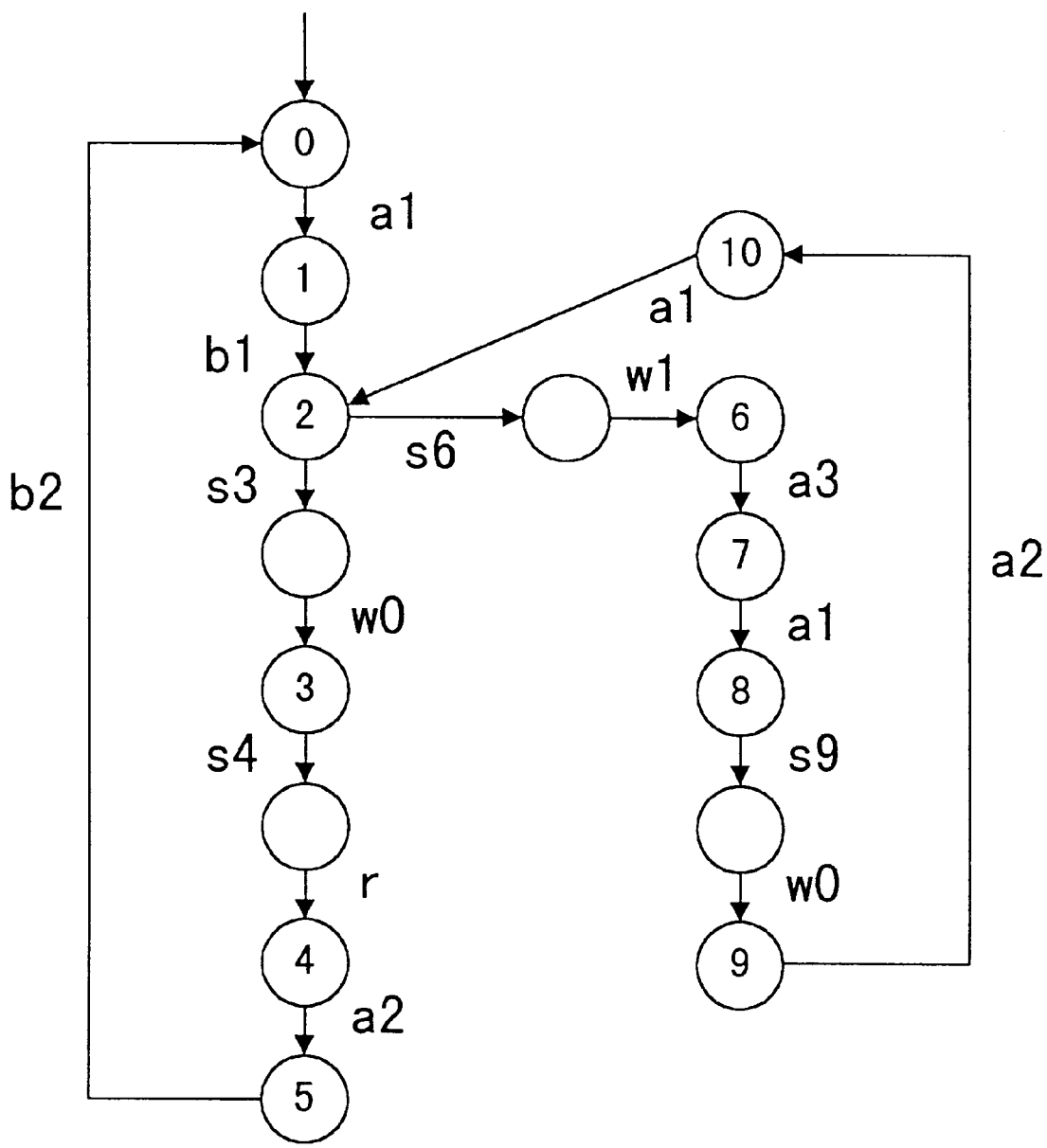
FIG. 22 is an example of the scenario graph into which synchronization instructions have been inserted in this embodiment.

Also assume that the scenario graph shown in FIG. 20 is generated for the first program. In this scenario graph, instructions w0, w1, and r are instructions which access a shared variable. FIG. 21 is a flowchart showing how expansion means 8 and conversion means 9 generate the second program.

Figure 23A:
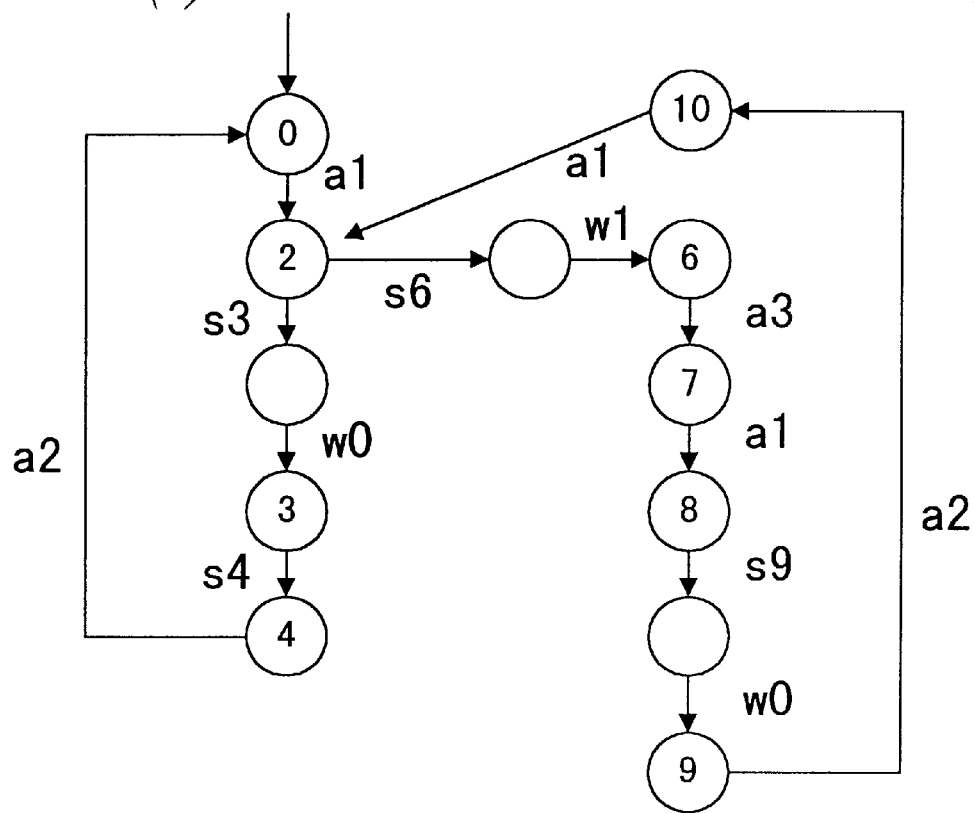
FIGS. 23(a) and 23(b) are examples of the scenario graph that has been disassembled in this embodiment.
Figure 23B:
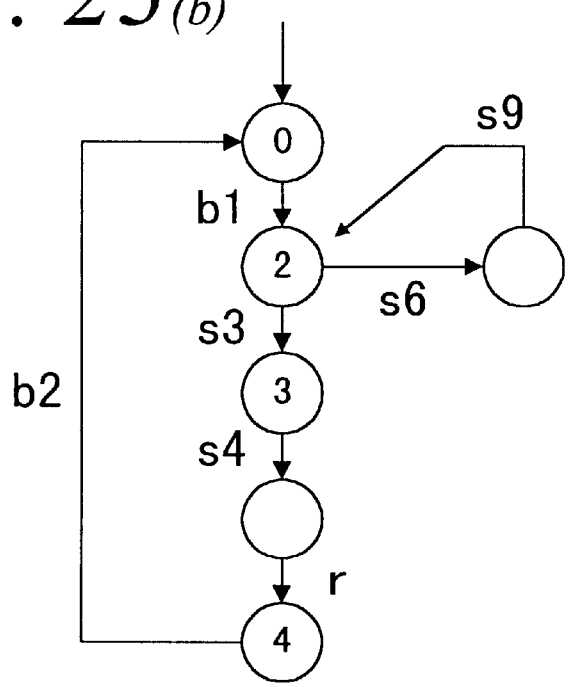

First, the scenario disassembly means 11 inserts synchronization instructions into the generated scenario (step 2101). This is done by inserting synchronization instructions before the instructions w0, w1, and r which access a shared variable and after all the branches. Then, the scenario disassembly means 11 disassembles the scenario containing synchronization instruction into two processes: P1 and P2 (step 2102). The scenario disassembly means 11 does this by imposing strong constraints, based on the fact that two processes, P1 and P2, will synchronize with each other in whatever state they are. FIG. 23 shows the disassembled scenario. FIG. 23(*a*) shows the scenario of process P1, and FIG. 23(*b*) shows the scenario of process P2. These two processes, P1 and P2, are given the same synchronization instructions, s0–s3, so that they will synchronize with each other.

Next, the scenario optimization means 12 optimizes the scenarios (step 2103). It analyzes the first program and deletes redundant synchronization instructions. More specifically, because there is a redundancy in the synchronization instructions s0–s3 shown in FIG. 23, the scenario optimization means 12 deletes redundant synchronization instructions while retaining required synchronization instructions. At this time, it uses the graph reduction rules shown in FIGS. 6 and 7; that is, it deletes synchronization instructions s2 and s3 from the scenario of process P2 shown in FIG. 23(b) according to rule2 and rule3 shown in FIG. 7(c). Similarly, it deletes the synchronization instructions s0 according to rule2 shown in FIG. 7(b). In addition, the scenario optimization means 12 deletes the synchronization instructions s0, s2, and 3 from the scenario in process P1, which correspond to the deleted synchronization instructions according to rule4.

Figure 24:
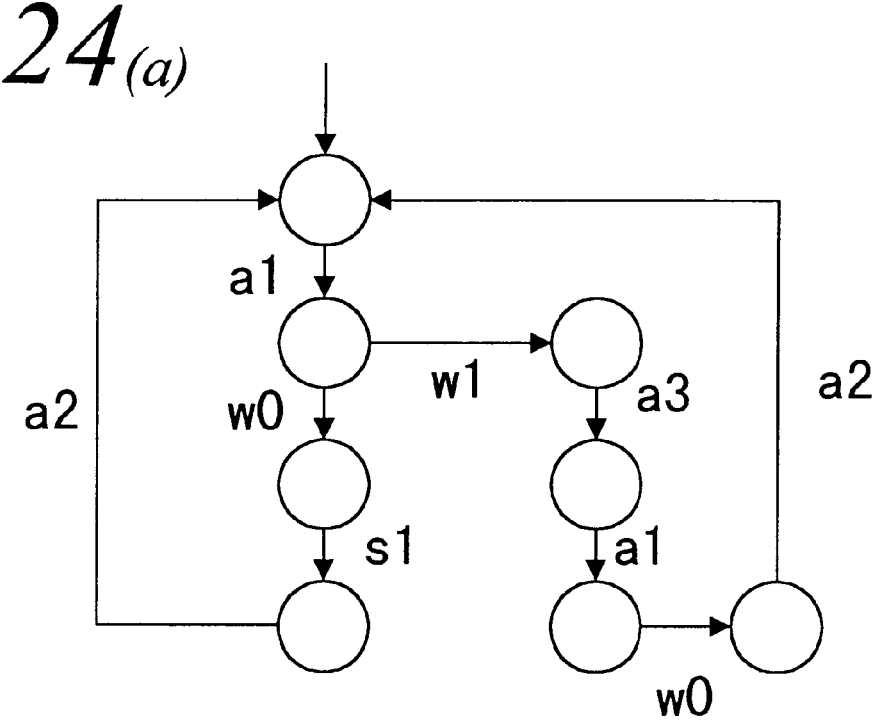
FIGS. 24(a) and 24(b) are examples of the optimized scenario graph used in this embodiment.
Figure 24:
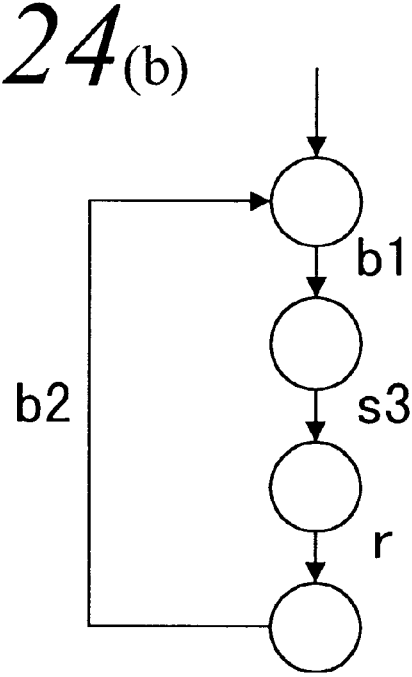

FIG. 24 shows an example of optimized scenario graphs. FIG. 24(a) shows the optimized scenario graph of process P1, while FIG. 24(b) shows the optimized scenario graph of process P2. In the graphs shown, all the synchronization instructions except the synchronization instruction s1 have been deleted. This optimization is performed to introduce a harmless nondeterminism into the program.

Next, the conversion means 9 generates a second program, the final concurrent program (step 2104). At this time, the conversion means 9 embeds the synchronization instruction, which were not deleted during scenario optimization, into the source code as the synchronization instruction "sync" (<ID>). That is, it inserts the synchronization instruction s1, shown in FIG. 24, into the source code as the synchronization instruction "sync" (s1). FIG. 25 shows the source code of the second program.

As described above, a concurrent program in this embodiment is controlled so that only the scenario which was validity-checked during simulation or the equivalent behaviors are executed. This results in the nondeterminism, not specified by a scenario, being excluded.

Effects

In this embodiment, a process is divided into a plurality of controllable sections, all the possible sequences of section execution in each process being represented by a scenario. Selecting the edge of a section to be executed first at each branch, deleting the possibility of another section, creates a scenario containing all the execution sequences intended by the designer. This scenario, once prepared, causes the first program to be converted to the second program containing execution timing control instructions, with no harmful nondeterminism in the second program.

Because the designer is able to create an intended program simply by specifying an execution sequence in the scenario in this manner, he can create a reliable concurrent program easily.

In addition, a scenario created in this embodiment does not contain a branch that is not selected because there is no dependency relation. This makes the scenario simple and easy to understand, and reduces the number of times the designer has to select, increasing programming efficiency. In this case, the execution sequence of a plurality of sections with no dependency relation does not result in nondeterminism. Therefore, a scenario not containing such execution sequences does not affect program reliability.

In addition, the user can simulate the first program during scenario generation to check to see if the program is executed according to the scenario. This feature allows the user to check the validity of a selected sequence according to the execution result or to find program bugs, thereby increasing program reliability and increasing programming efficiency.

(3) Other embodiments

This invention is not restricted to the preferred embodiments described herein, but may be embodied in other specific forms, such as those described below, without departing from the spirit or essential characteristics thereof. For example, the number of processes (tasks) need not be two; any number of processes may be used.

In the above embodiment, the designer selects one of two sections only when the sections have a dependency relation; for those sections with no dependency relation, the system selects one of the sections automatically. This is not always required. For example, the designer may select one of the sections with no dependency relation. This means that the designer is requested to select one of the sections at each node. In this case, it is possible to omit expansion processing to be executed after section selection.

Figure 26:
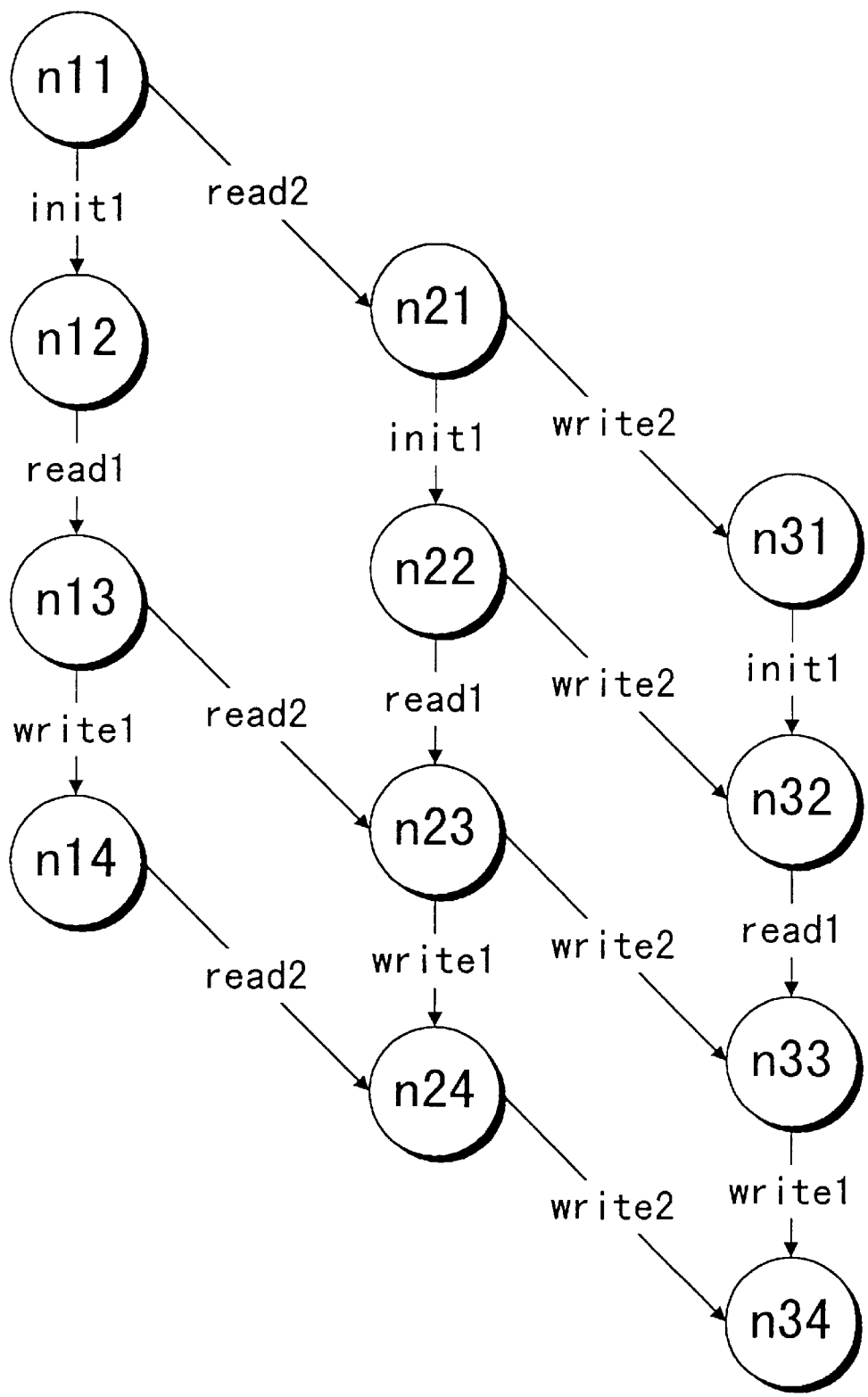
FIG. 26 is a diagram showing the scenario graph in which read2, one of the branches with no dependency relation at node n12, has been deleted in this embodiment.

After generating temporarily the scenario shown in FIG. 10, for the branches of the sections without a dependency relation, either one may be deleted automatically. For example, for the branch of section read1 and section read2, each section without a dependency relation, as shown in FIG. 26, the generation means 4 may delete the one of those sections (e.g. read2).

Figure 27:
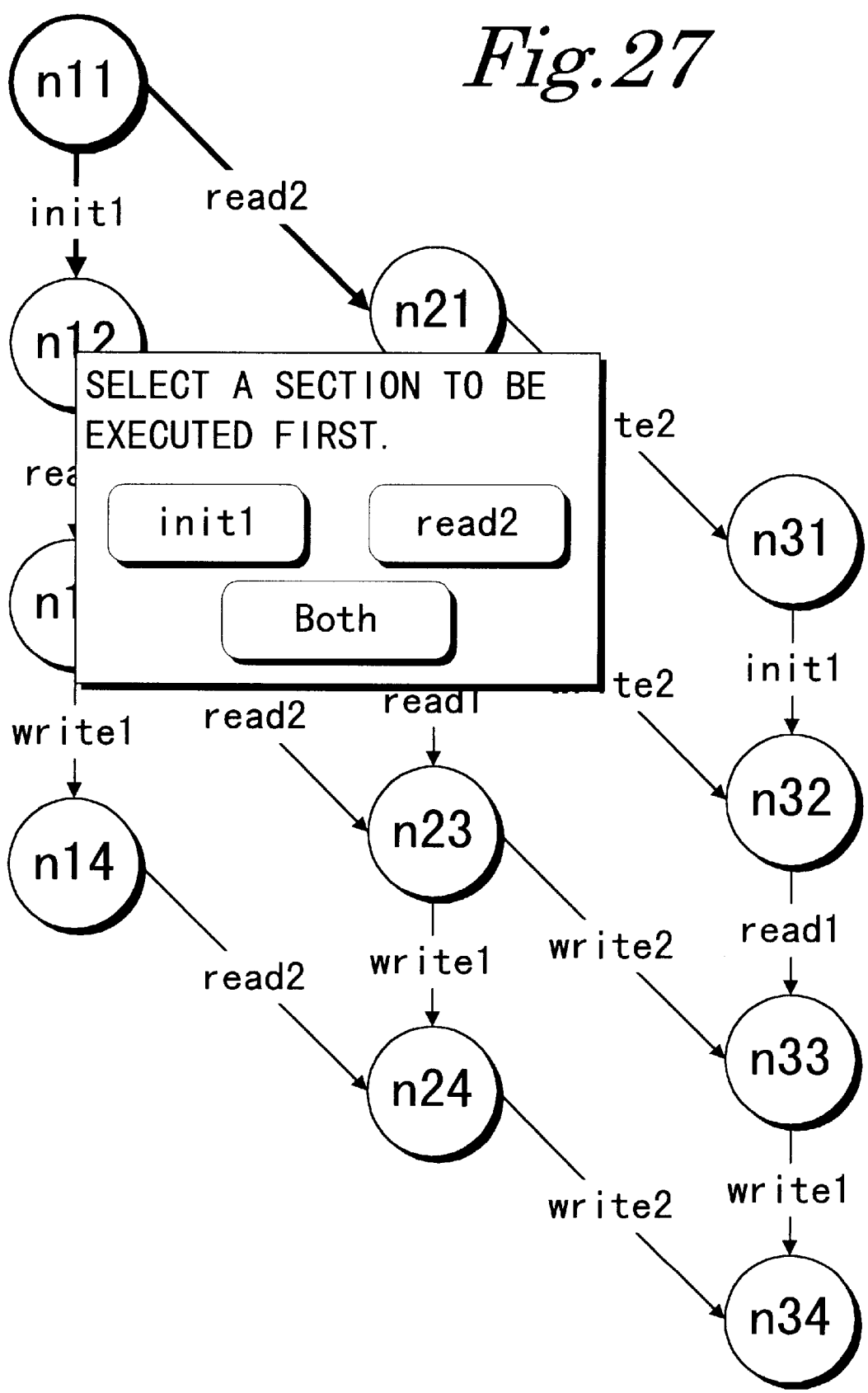
FIG. 27 is an example of the screen on which the scenario graph is displayed and the designer is requested to select a section in this embodiment.
Figure 28:
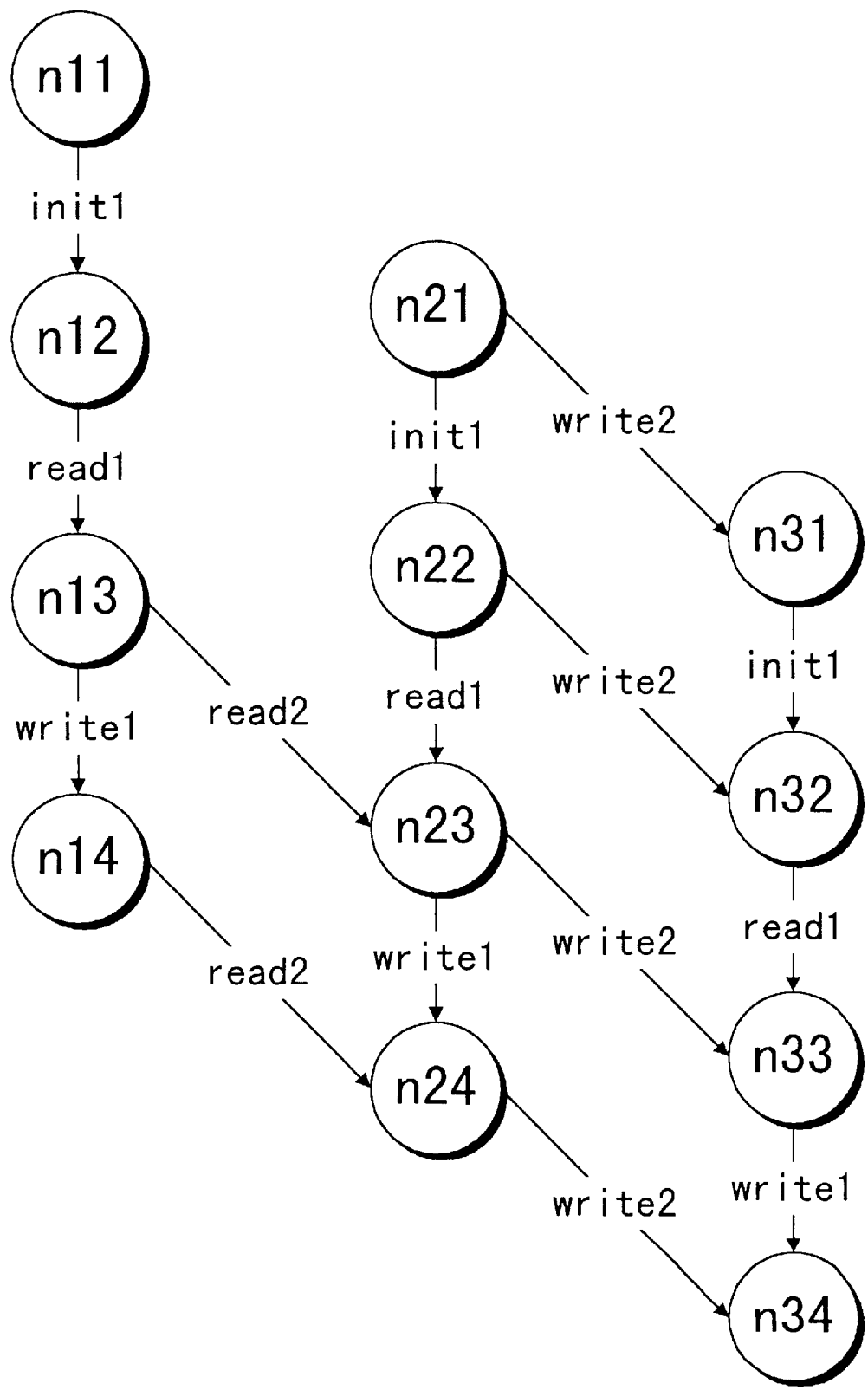
FIG. 28 is a diagram showing the status of the scenario graph in which the section read2 has been deleted from node n11 in this embodiment.
Figure 29:
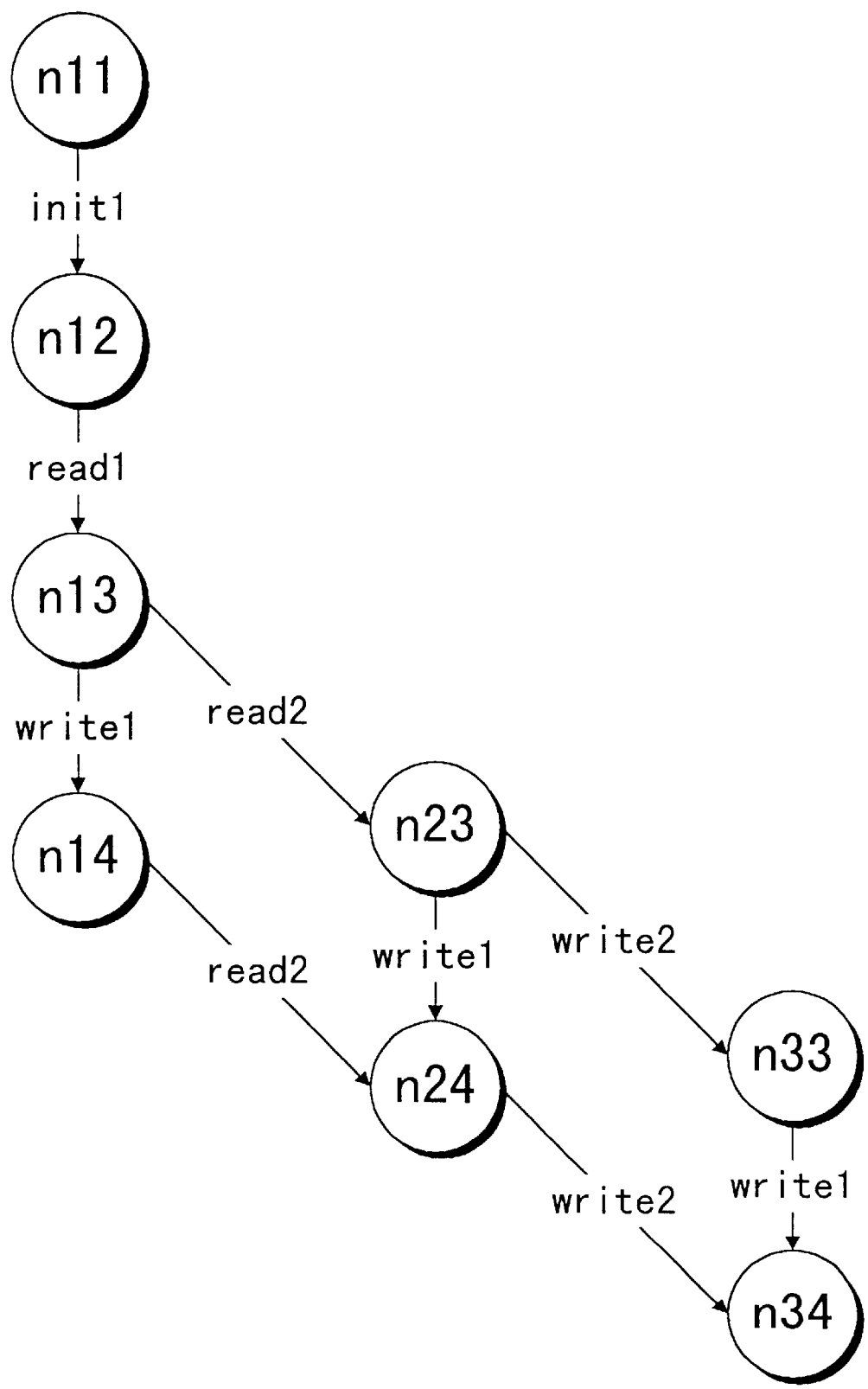
FIG. 29 is a diagram showing the status of the scenario graph in which nodes n21, n31, and n32 have been deleted sequentially in this embodiment.

Also, for a branch with a dependency relation such as the one shown in FIG. 27, the display means 5 displays a scenario graph on the screen to allow the designer select one of the sections. To do so, the display means displays a node from which the edges, associated with the sections with a dependency relation, are branched to allow the designer to select one of the sections. In FIG. 27, node n11 and edges init1 and read2, which are associated with the sections from which the designer is to select, are shown in boldface and, in addition, the window for selection is displayed. FIG. 28 shows the scenario graph from which section read2 has been deleted from node n11. After that, nodes n21, n31, n22, and n32, whose only input was the deleted edge read2, are deleted sequentially. FIG. 29 shows the scenario graph from which these nodes have been deleted.

Figure 30:
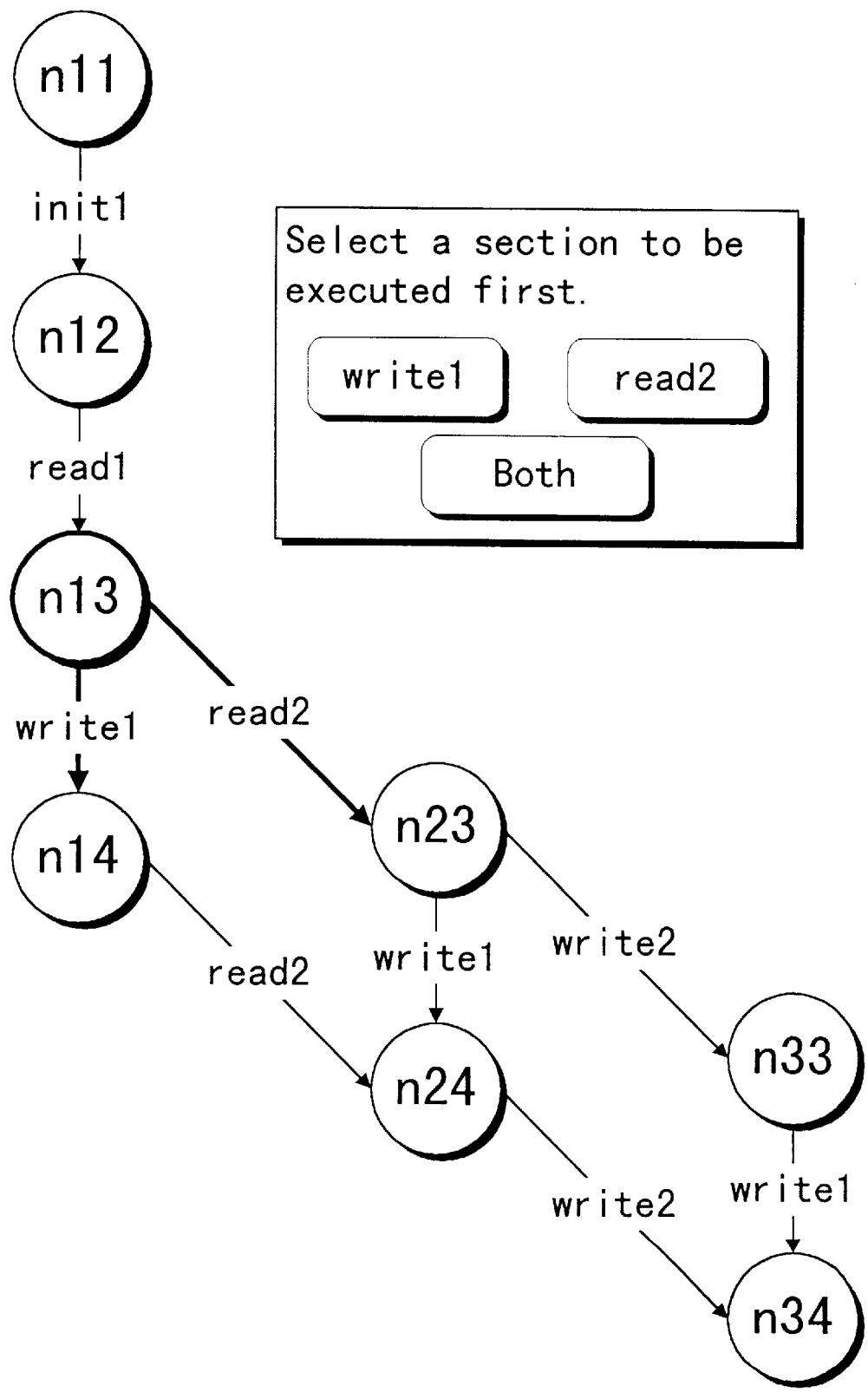
FIG. 30 is a diagram showing an example of the screen on which the designer is requested to select write1 or read2 at node n13 in this embodiment.
Figure 31:
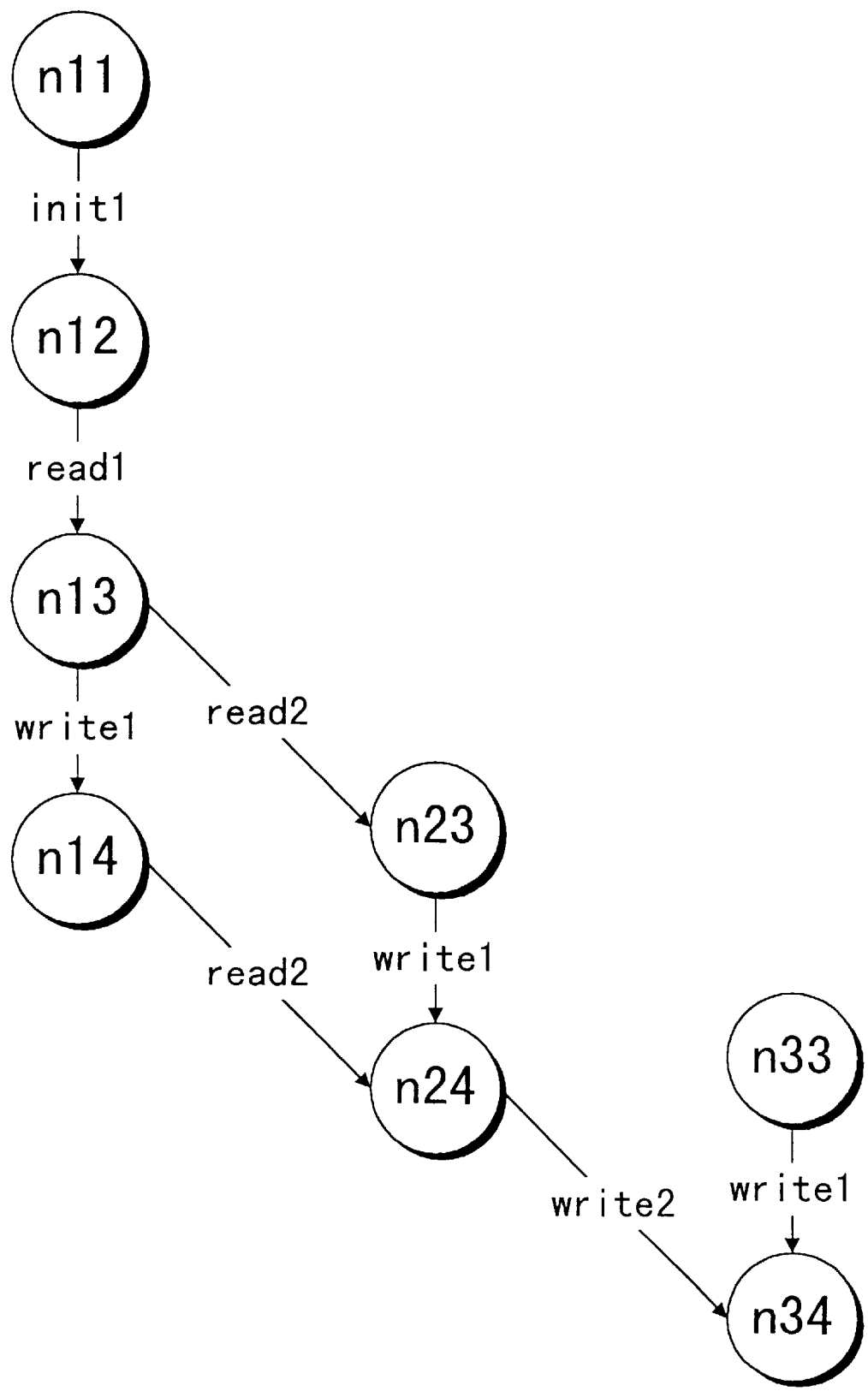
FIG. 31 is a diagram showing the status of the scenario graph in which the designer selects, at node n23, write2 as an instruction to be executed after write1 in this embodiment.

When the designer selects the icon "Both" from the window as described earlier, the edges are not deleted. FIG. 30 shows an example of the screen on which the designer is prompted to select either write1 or read2. When the designer select "Both" on this screen, the edges are not deleted, and the screen shown in FIG. 30 remains unchanged. At node 23, when the designer selects write2 as an instruction to be executed after write1 and deletes wirte2 as shown in FIG. 31, node 33 will also be deleted. The scenario graph shown in FIG. 15 is generated in this manner.

The designer can perform the simulation of the paths contained in the scenario graph at that time. This is done by executing, in the interpreter mode, the section instructions associated with the edges, one at a time, in the order in which the edges appear. For a scenario containing a plurality of paths, the designer may also click the mouse to select an edge on a path to be simulated.

A section need not be an instruction but may be other type of execution unit such as a routine or a function. The number of branches from one node need not always be two; one node may have three or more branches. The format of the screen on which information is entered or displayed need not be the one described in the embodiment. The user may design the format as he likes.

Figure 32:
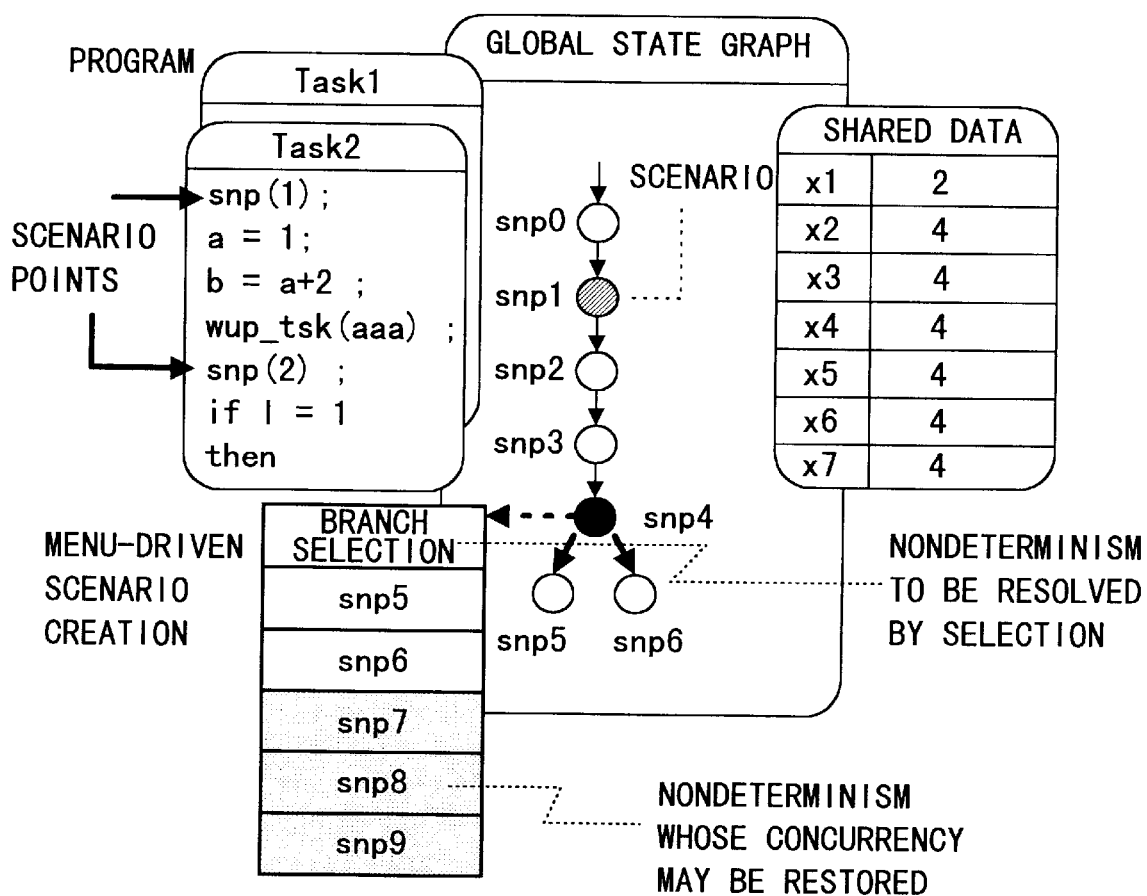
FIG. 32 is a diagram showing another example of the screen on which the scenario is displayed and the designer selects one of branches in this embodiment.
Figures 33A, 33B:
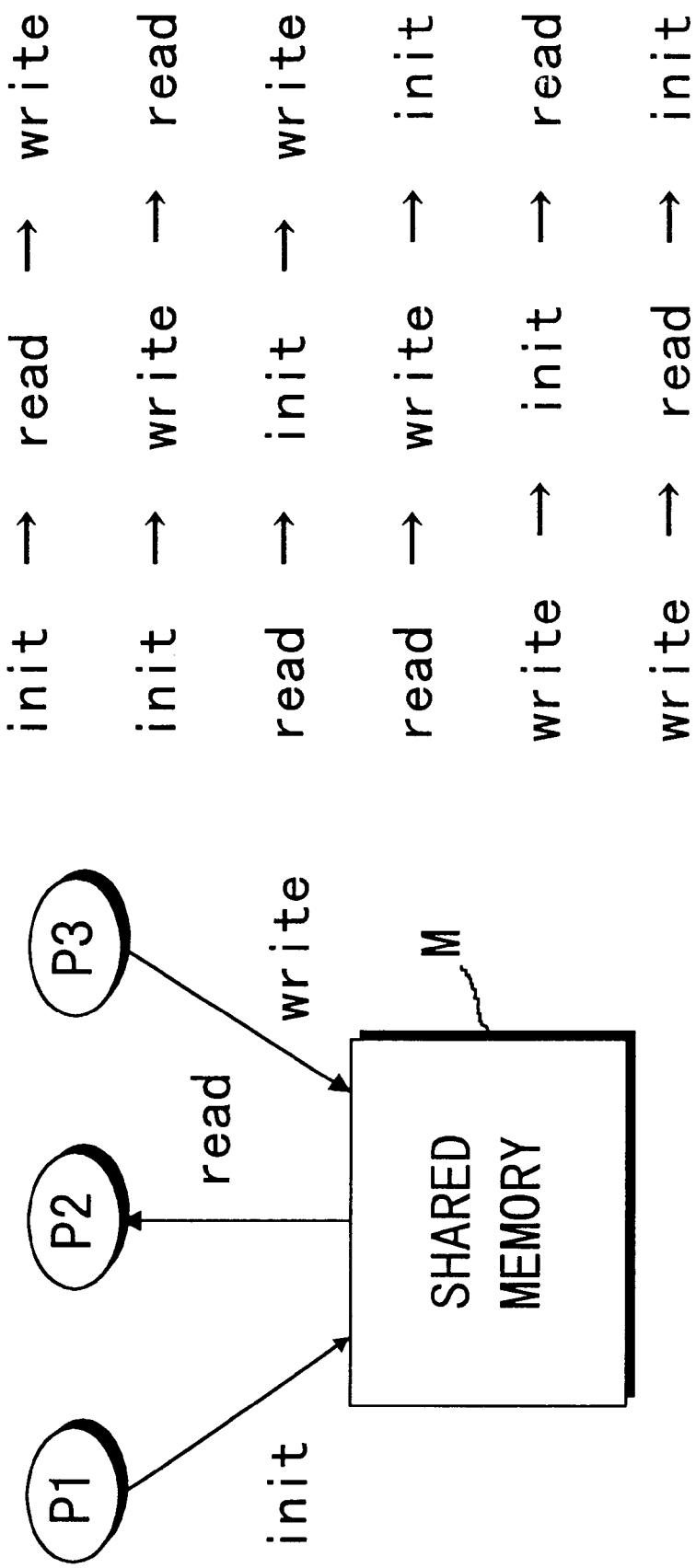
FIG. 33(a) is a diagram explaining a problem of the prior art.
FIG. 33(b) is a diagram explaining a problem of the prior art.

FIG. 32 shows another example of screen the designer uses to display a scenario or to select branches. On the screen shown in the figure, scenario points such as "snp(1)" are displayed in the windows labeled "Task 1" or "Task 2"; they are scenario points specified in the program. Under the window "Global state graph" is displayed the scenario graph of a generated scenario. In this example, the "Branch selection" window is displayed to prompt the designer to select either snp5 or snp6 at snp4. In addition, data shared by a plurality of processes is shown as "shared data".

In addition, the method for defining the execution sequence of processes in the second program is not restricted to the "send synchronization signal" instruction or "wait for synchronization signal" instruction. Other methods such as transferring tokens may also be used.

Effects of the invention

As described above, this invention makes it possible to develop reliable concurrent programs easily.

While a preferred embodiment has been described, variations thereto will occur to those skilled in the art within the scope of the present inventive concepts which are delineated by the following claims.

What is claimed is:

1. A system for assisting a program designer to remove program errors of a concurrent program, said system comprising:

division means for dividing each process of a first concurrent program, consisting of a plurality of processes, into a plurality of sections;

generation means for generating a network structure, consisting of nodes and arrows, which represents a set of possible execution orders of said sections of said first concurrent program, where each arrow indicates a section, and a path of said network structure indicates a possible execution order of said sections;

selection means for selecting sections represented by said arrows at each branch of said network structure; and conversion means for converting said first concurrent program to a second concurrent program which executes selected execution orders consisting of said selected sections of said first concurrent program selected by said selection means and does not execute sections which are not selected.

2. A method for assisting a program designer to detect program errors, said method comprising:

a division step for dividing each process of a first concurrent program, consisting of a plurality of processes, into a plurality of controllable sections;

a generation step for generating an execution path representing all the possible execution sequences of said sections of each of said processes with the use of branches between said sections;

a selection step for selecting sections at branches in said execution path generated by said generation step; and a conversion step for converting said first concurrent program to a second concurrent program executing a sequence of said sections according to said execution path consisting of branches of sections selected by said selection step.

3. A system for assisting a program designer to detect program errors, said system comprising:

division means for dividing each process of a first concurrent program, consisting of a plurality of processes, into a plurality of controllable sections;

generation means for generating possible execution paths among all the possible execution sequences of said sections of each of said processes, said possible execution paths including branches in execution sequences of said sections;

selection means for selecting sections at branches in said possible execution paths generated by said generation means; and conversion means for converting said first concurrent program to a second concurrent program having selected sections at branches being selected by said selection means.

4. A system as claimed in claim 3 wherein said generation means generates an execution path consisting of branches between sections affecting the execution result of said second concurrent program as a result of said selection, said execution path representing the execution sequence of said sections of each process.

5. A system as claimed in claim 4, further comprising an expansion means for expanding said execution path by adding the branches between sections not affecting the execution result of said second concurrent program as a result of said selection.

6. A system for assisting a program designer to detect program errors, said system comprising:

division means for dividing each process of a first concurrent program, consisting of a plurality of processes, into a plurality of controllable sections;

detection means for detecting a dependency relation between said sections;

generation means for generating an execution path representing all the possible execution sequences of said sections of each process with the use of branches between said sections;

selection means for selecting said sections at the branches having a dependency relation; and conversion means for converting said first concurrent program to a second concurrent program executing a sequence of said sections according to said execution path consisting of branches of sections selected by said selection means.

7. A system as claimed in claim 6 wherein said generation means generates an execution path consisting of branches between sections having said dependency relation, said execution path representing the execution sequence of said sections of each process.

8. A system as claimed in claim 7, further comprising expansion means for expanding said execution path by adding the branches between sections not having said dependency relation.

9. A system as claimed in claim 3 or 6, further comprising execution means for simulating said first concurrent program according to the execution sequence of sections indicated by said execution path created after selection by said selection means.

10. A system as claimed in claim 3 or 6 wherein said conversion is performed by inserting a first instruction for maintaining process synchronization after said section to be executed first with respect to said dependency relation and by inserting a second instruction, corresponding to the first instruction, before said section to be executed next with respect to said dependency relation.

11. A system as claimed in claim 5 or 8 wherein said expansion means comprises:

disassembly means for disassembling said execution path for each process to generate an execution path for each process; and optimization means for optimizing the execution path of each process by deleting redundant parts, said conversion means generates said second concurrent program based on each optimized execution path.

12. A system as claimed in claim 5 or 8 wherein said expansion means comprises:

disassembly means for disassembling said execution path for each process to generate an execution path for each process; and deletion means for deleting redundant parts of the execution path of each process, said conversion means generates said second concurrent program based on each optimized execution path, said disassembly means adding synchronization constraints to each execution path to establish synchronization when disassembling said execution path, and said optimization means removing redundant synchronization constraints from said synchronization constraints.

13. A system for assisting a program designer to detect program errors, said system comprising:

generation means for generating an execution path representing all the possible execution sequences of a plurality of sections, each process of a first concurrent program consisting of said plurality of sections; and conversion means for converting said first concurrent program to a second concurrent program executing a sequence of said sections according to said execution path generated by said generation means;

expansion means for expanding said execution path by adding branches between sections not having a dependency relation, said expansion means including
disassembly means for disassembling said execution path for each process to generate an execution path for each process; and
deletion means for deleting redundant parts of the execution path of each process, said conversion means generates said second concurrent program based on each optimized execution path.

14. A system as claimed in claim 13 wherein said disassembly means adds synchronization constraints to each execution path to establish synchronization when disassembling said execution path, and said deletion means removes redundant synchronization constraints from said synchronization constraints.

15. A method for assisting a program designer to detect program errors, said method comprising:

a division step for dividing each process of a first concurrent program, consisting of a plurality of processes, into a plurality of controllable sections;

a detection step for detecting a dependency relation between said sections;

a generation step for generating an execution path representing all the possible execution sequences of said sections of each process with the use of branches between said sections;

a selection step for selecting said sections at the branches having a dependency relation; and a conversion step for converting said first concurrent program to a second concurrent program executing a sequence of said sections according to said execution path, consisting of branches of sections selected by said selection step.

16. A method for assisting a program designer to detect program errors, said method comprising:

a generation step for generating an execution path representing all the possible execution sequences of a plurality of sections, each process of a first concurrent program consisting of said plurality of sections; and a conversion step for converting said first concurrent program to a second concurrent program executing a sequence of said sections according to said execution path generated by said generation step, wherein said expansion step comprises:

a disassembly step for disassembling said execution path for each process to generate an execution path for each process; and a deletion step for deleting redundant parts of the execution path of each process, said conversion step generates said second concurrent program based on each optimized execution path.

* * * * *